(12) United States Patent
Simakov et al.

(10) Patent No.: US 9,359,201 B2
(45) Date of Patent: Jun. 7, 2016

(54) HYDROGEN PRODUCTION BY AN AUTOTHERMAL HEAT EXCHANGER PACKED-BED MEMBRANE GAS REFORMER

(75) Inventors: David Stanislav A. Simakov, Nazareth Illit (IL); Moshe Sheintuch, Haifa (IL)

(73) Assignee: Technion Research & Development Foundation Ltd., Haifa (IL)

( * ) Notice: Subject to any disclaimer, the term of this patent is extended or adjusted under 35 U.S.C. 154(b) by 860 days.

(21) Appl. No.: 13/387,841

(22) PCT Filed: Aug. 2, 2010

(86) PCT No.: PCT/IL2010/000625
§ 371 (c)(1),
(2), (4) Date: Jan. 30, 2012

(87) PCT Pub. No.: WO2011/016030
PCT Pub. Date: Feb. 10, 2011

(65) Prior Publication Data
US 2012/0129064 A1  May 24, 2012

Related U.S. Application Data

(60) Provisional application No. 61/230,765, filed on Aug. 3, 2009, provisional application No. 61/294,527, filed on Jan. 13, 2010.

(51) Int. Cl.
*C01B 3/38* (2006.01)
*B01J 8/00* (2006.01)
*B01J 8/02* (2006.01)

(52) U.S. Cl.
CPC .............. *C01B 3/384* (2013.01); *B01J 8/009* (2013.01); *B01J 8/0221* (2013.01); *C01B 3/382* (2013.01); *B01J 2208/00053* (2013.01); *B01J 2208/00061* (2013.01); *B01J 2208/00132* (2013.01); *B01J 2208/00212* (2013.01); *B01J 2208/00309* (2013.01); *B01J 2208/00557* (2013.01); *C01B 2203/0233* (2013.01); *C01B 2203/0261* (2013.01); *C01B 2203/041* (2013.01); *C01B 2203/0811* (2013.01); *C01B 2203/0827* (2013.01); *C01B 2203/0844* (2013.01); *C01B 2203/0894* (2013.01); *C01B 2203/1058* (2013.01); *C01B 2203/148* (2013.01); *Y10T 29/49* (2015.01)

(58) Field of Classification Search
CPC .......... C01B 3/84; C01B 3/382; C01B 8/009;
C01B 2203/0811; C01B 2203/0844; C01B
2203/0894; C01B 2203/0233; C01B
2203/1058; C01B 2203/0827; C01B
2203/041; C01B 2203/0261; C01B 2203/148;
C01B 2208/00053; C01B 2208/00061; C01B
2208/00132; C01B 2208/00212; C01B
2208/00309; C01B 2208/00557; C01J 8/0221;
Y10T 24/49
See application file for complete search history.

(56) References Cited

U.S. PATENT DOCUMENTS

| | | | | |
|---|---|---|---|---|
| 4,758,375 | A * | 7/1988 | Brophy | C01B 3/44 252/373 |
| 5,510,056 | A * | 4/1996 | Jacobs et al. | 252/373 |
| 5,637,259 | A * | 6/1997 | Galuszka et al. | 252/373 |
| 5,861,137 | A | 1/1999 | Edlund | |
| 5,869,011 | A * | 2/1999 | Lee | 422/200 |
| 6,207,132 | B1 * | 3/2001 | Lin et al. | 423/648.1 |
| 6,881,394 | B2 * | 4/2005 | Keller | 423/652 |
| 2002/0034458 | A1 | 3/2002 | Roy | |
| 2003/0068260 | A1 | 4/2003 | Wellington | |
| 2003/0159354 | A1 * | 8/2003 | Edlund et al. | 48/127.9 |
| 2004/0265224 | A1 * | 12/2004 | Papavassiliou et al. | 423/651 |
| 2005/0178063 | A1 | 8/2005 | Reinke | |
| 2006/0292069 | A1 * | 12/2006 | Pez et al. | 423/651 |
| 2008/0019902 | A1 | 1/2008 | Rei | |
| 2009/0026420 | A1 * | 1/2009 | Xu | 252/373 |
| 2009/0170967 | A1 | 7/2009 | You | |

FOREIGN PATENT DOCUMENTS

| | | | |
|---|---|---|---|
| EP | 0 615 949 | 9/1994 | |
| EP | 1 024 111 | 8/2000 | |
| EP | 1 561 725 | 8/2005 | |
| EP | 1561725 | * 8/2005 | ............... C01B 3/50 |

| | | | | |
|---|---|---|---|---|
| EP | 1561725 | * 10/2005 | ............ | C01B 3/50 |
| JP | 6 040703 | 2/1994 | | |
| WO | 2007/031713 | 3/2007 | | |
| WO | WO 2007/111278 | * 10/2007 | ............ | C01B 3/38 |

OTHER PUBLICATIONS

Simakov et al AIChE J vol. 54 No. 10 pp. 2735-2750 Online Jul. 11, 2008.*
Wu (Ind. Eng. Chem. Res. 2003 vol. 42 pp. 3225-3229).*
McGraw-Hill (McGraw-Hill dictionary of Scientific and Technical Terms 6th ed. © 2003).*
IPRP CH I for PCT/IL2010/000625—9 pages, mailed Feb. 7, 2012.
D. Simakov, M. Sheintuch: "Design of a Thermally . . . Production", AICHE Journal, vol. 54, No. 10, Jul. 11, 2008, pp. 2735-2750, XP002605013.
Patel et al: "Modeling and simulation . . . reactor", Int'l J of Hydrogen Energy, Elsevier Sci Pub B.V., Barking, GB, vol. 32, No. 13, Aug. 28, 2007, pp. 2344-2358, XP022216622.
Simakov D S A et al: "Demonstration of a scaled-down . . . generation", Int'l J of Hydrogen Energy, Elsevier Sci Pub B.V., Barking, GB, vol. 34, No. 21, Nov. 1, 2009, pp. 8866-8876, XP026698204.
Xu J et al.. "Methane Steam Reforming, Methanation and Water-Gas Shift: 1. Intrinsic Kinetics" AIChE Journal. 1989; 35:88-96).
Chen Y. et al., "Efficient production of hydrogen from natural gas steam reforming in palladium membrane reactor" Appl Catal B Environ. Jun. 2008; vol. 81: Issues 3-4; 283-294.
Patil C.S. et al., "Fluidised bed membrane reactor for ultrapure hydrogen production via methane steam reforming: Experimental demonstration and model validation" Chem Eng Sci. Jun. 2007; vol. 62, issue 11, 2989-3007.
Gallucci F. et al., "Autothermal Reforming of Methane with Integrated CO2 Capture in a Novel Fluidized Bed Membrane Reactor. Part 1: Experimental Demonstration" Top Catal. 2008;51:133-145.
Chen Z. et al., "Experimental studies of pure hydrogen production in a commercialized fluidized-bed membrane reactor with SMR and ATR catalysts" Int J Hydrogen Energy. 2007;32:2359-2366.
Xu J et al.. "Methane Steam Limitations and Reforming: II. Diffusional Reactor Simulation" AIChE Journal. 1989; 35: 97-103).

* cited by examiner

*Primary Examiner* — Patrick Ryan
*Assistant Examiner* — Aaron Greso

(74) *Attorney, Agent, or Firm* — Roach Brown McCarthy & Gruber, P.C.; Kevin D. McCarthy

(57) ABSTRACT

A process for producing hydrogen from natural gas, said process comprises the steps of: (i) providing an autothermal heat exchanger packed-bed membrane reformer (APBMR) comprising: (a) an elongated external gas oxidation compartment comprising an inlet, an outlet and packed oxidation catalyst particles, said inlet and outlet being located each at one extremity of said external gas oxidation compartment; (b) an elongated internal gas steam-reforming compartment comprising an inlet, an outlet and packed steam-reforming catalyst particles, said inlet and outlet being located each at one extremity of said internal gas steam-reforming compartment; (c) one or more hydrogen-separating membrane(s) positioned in said steam-reforming compartment substantially parallel to the longitudinal axis of said steam-reforming compartment; (d) one insulation layer surrounding said external compartment; and, optionally, (e) one or more elongated internal gas oxidation compartment(s) positioned in said steam-reforming compartment substantially parallel to the longitudinal axis of said gas steam-reforming internal compartment, and comprising an inlet, an outlet and packed oxidation catalyst particles, said inlet and outlet being located each at an extremity of said internal gas oxidation compartment(s); (ii) supplying a mixture comprising said natural gas and air to said gas oxidation compartment(s) of said reformer; and (iii) supplying a mixture comprising said natural gas and water to said gas steam-reforming compartment, wherein the water-to-gas molar ratio is of between 2 and 4, and wherein the water may be pre-vaporized before being supplied into said gas steam-reforming compartment; thereby producing hydrogen suitable to be directly fed into a power generating device (PGD) to generate an electrical power, or to be stored into a suitable container before further use.

25 Claims, 12 Drawing Sheets

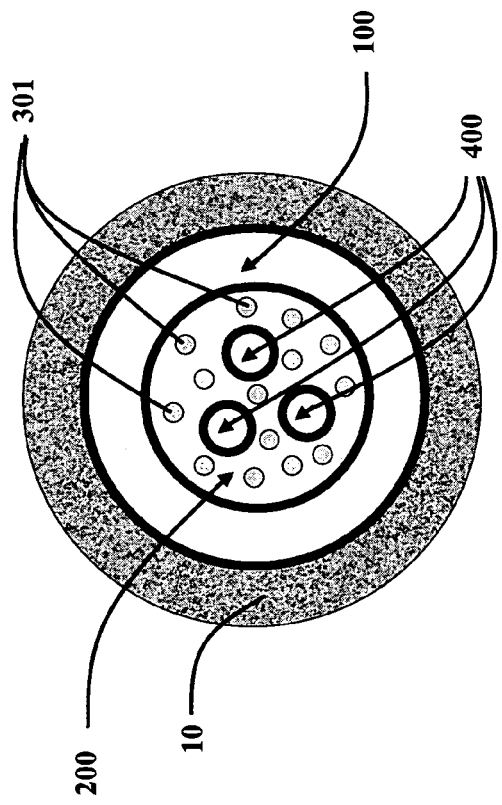
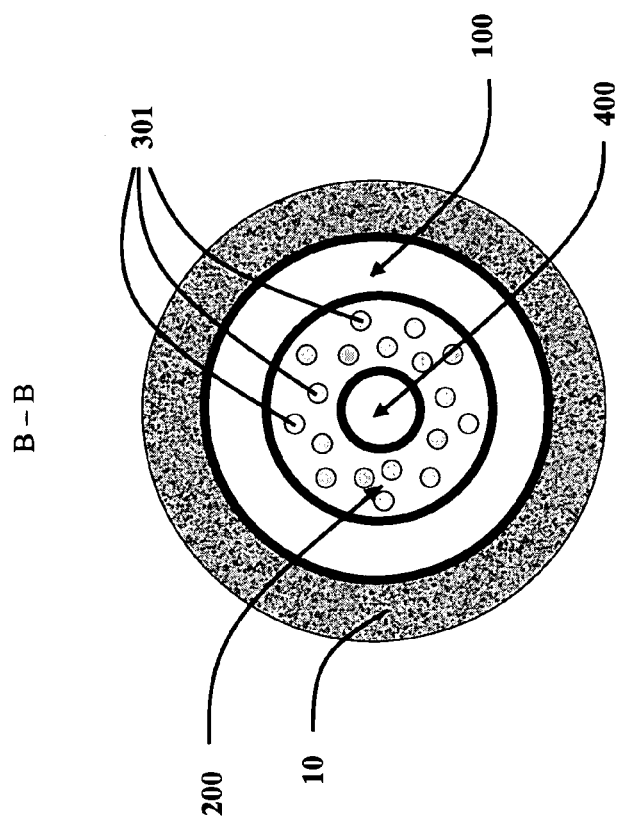
Fig. 4C
Fig. 4B

HYDROGEN PRODUCTION BY AN AUTOTHERMAL HEAT EXCHANGER PACKED-BED MEMBRANE GAS REFORMER

REFERENCE TO CO-PENDING APPLICATIONS

Priority is claimed as a 371 of international application number PCT/IL2010/000625, filed on Aug. 2, 2010; which claims priority to U.S. Provisional Patent application Nos. (a) 61/230,765, filed on Aug. 3, 2009 and (b) 61/294,527, filed on Jan. 13, 2010.

FIELD OF THE INVENTION

The present invention relates to the field of hydrogen production and more particularly to apparatus and methods for generating hydrogen from natural gas by catalytic steam-reforming in a compact autonomous membrane reformer unit.

BACKGROUND OF THE INVENTION

Hydrogen is a very promising environmentally friendly fuel. The combustion of hydrogen in electrical power generating devices (PGDs), such as fuel cells, directly produces electricity in a pollution-free way with an efficiency that is much higher than that of heat engines, with water being the only byproduct. The high energy transformation efficiency of fuel cells may decrease significantly carbon dioxide emission, even when fossil fuels are used as a source of hydrogen. Conventionally, hydrogen production is carried out by the industrial-scale steam-reforming of natural gas, which is a multistage process that includes several reaction steps with heat-exchange between them, as steam-reforming is highly endothermic, followed by hydrogen extraction and purification. Water electrolysis is another well-known hydrogen generation process, which is, however, the most energy-demanding way to produce hydrogen unless renewable energy sources are used.

Unless produced on-site, hydrogen has to be compressed or liquefied, stored, transported and distributed to the end user. This, as well as the complexity and high energy demands of the conventional hydrogen generation processes, reduces significantly the overall efficiency of the hydrogen-based energy pathway, making the price of hydrogen uneconomical for practical applications. Therefore, on-site hydrogen generation from natural gas via an autonomous membrane reformer may be a very promising approach that can save costs of hydrogen storage and distribution (see FIG. 1). In addition, whereas conventional steam-reforming is a multistage process that includes several reaction steps including hydrogen separation, the use of an autothermal membrane reformer may help to combine all the processes in one compact and thermally independent unit (see FIG. 2).

Hydrogen production in membrane reactors via methane steam-reforming (MSR) has been extensively investigated in the last two decades. Methane steam-reforming is commonly described by three reactions: methane steam-reforming, i.e. converting methane to water and carbon monoxide (Eq.1), water gas shift (WGS, Eq.2), and the overall MSR reaction (Eq.3):

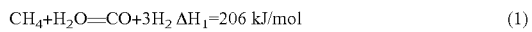

$$CH_4 + H_2O \rightleftharpoons CO + 3H_2 \quad \Delta H_1 = 206 \text{ kJ/mol} \tag{1}$$

$$CO + H_2O \rightleftharpoons CO_2 + H_2 \quad \Delta H_2 = -41 \text{ kJ/mol} \tag{2}$$

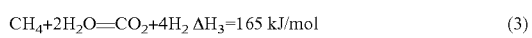

$$CH_4 + 2H_2O \rightleftharpoons CO_2 + 4H_2 \quad \Delta H_3 = 165 \text{ kJ/mol} \tag{3}$$

The overall process is highly endothermic, and the heat required can be advantageously supplied via methane oxidation (MOx) (Eq.4):

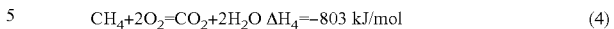

$$CH_4 + 2O_2 \rightleftharpoons CO_2 + 2H_2O \quad \Delta H_4 = -803 \text{ kJ/mol} \tag{4}$$

Methane steam-reforming is of particular interest due to the large natural gas resources around the world, and the fact that steam (i.e. water) may be easily supplied.

As it can be appreciated from the equations above, methane steam-reforming is a highly endothermic process (Xu J et al. *AIChE Journal.* 1989; 35:88-103). Nowadays, there are two conventional approaches for increasing the steam-reforming efficiency: autothermal steam-reforming and partial oxidation. Yet, the implementation of these processes has been often problematic due to several issues such as the selection of an adequate catalyst and the limitation in hydrogen separation capabilities. In most cases, wherein an exothermic reaction is directly coupled to the steam-reforming reaction, the catalyst should be suitable both for reforming and oxidation, and should be able to withstand hot spots emerging in the catalyst bed during methane oxidation. Regarding hydrogen separation, the advantages of combining steam-reforming and hydrogen separation in a single device have been described previously (Chen Y. et al., *Appl Catal B Environ.* 2008; 80:283-294; Patil C. S. et al., *Chem Eng Sci.* 2007; 62:2989-3007; Gallucci F. et al., *Top Catal.* 2008; 51:133-145; Chen Z. et al., *Int J Hydrogen Energy.* 2007; 32:2359-2366). However, when autothermal reforming or partial oxidation is employed in such membrane-assisted reforming applications, they may suffer from limited separation capability. When using air as a source of oxygen (using pure oxygen is neither a convenient nor cost effective approach), the reaction mixture is diluted by nitrogen, which causes a decrease in the hydrogen partial pressure difference (existing between the catalytic bed and the membrane interior) that drives hydrogen separation. Therefore, inadequate catalyst selection and issues in hydrogen separation may reduce significantly the membrane reformer efficiency, limit the hydrogen output, and induce low power densities.

Hydrogen production via membrane reformers has been described for instance in U.S. Pat. No. 5,861,137, US 2002/034458, US 2003/068260, US 2005/0178063, WO 2007/031713, US 2009/0170967, and US 2008/0019902.

However, prior art membrane reformers are generally not optimized in terms of overall energy conversion efficiency (from natural gas to hydrogen) and power density (hydrogen output per unit reformer volume), and are generally cumbersome. In particular, reformers which are not autonomous and lack an optimized thermal management, lead to low energy conversion efficiencies. Low power density usually results from poor technical integrations (e.g. multiple units) and from the implementation of bulky reactor designs (e.g. fluidized bed, thermal combustion).

Therefore, it is an object of the present invention to provide an energy efficient process for generating hydrogen.

It is a further object of the invention to provide an autothermal and compact apparatus for the production of hydrogen from a natural gas.

It is yet a further object of the invention to provide a system suitable to generate hydrogen from a natural gas and generate an electrical power suitable to be used by electrically driven components, machine, apparatus, and vehicles.

It is yet a further object of the invention to provide a method for manufacturing and determining the structural and functional characteristics of an autothermal heat exchanger packed-bed membrane reformer' (APBMR), able to fit a specific power generating device (PGD) having a determined power efficiency and a determined power output.

These and other objects of the invention will become apparent as the description proceeds.

SUMMARY OF THE INVENTION

According to a first aspect, the invention relates to a process for producing hydrogen from natural gas, which comprises the steps of:
(i) providing an autothermal heat exchanger packed-bed membrane reformer (APBMR) comprising:
  (a) an elongated external gas oxidation compartment comprising an inlet, an outlet and packed oxidation catalyst particles, said inlet and outlet being located each at one extremity of said external gas oxidation compartment;
  (b) an elongated internal gas steam-reforming compartment comprising an inlet, an outlet and packed steam-reforming catalyst particles, said inlet and outlet being located each at one extremity of said internal gas steam-reforming compartment;
  (c) one or more hydrogen-separating membrane(s) positioned in said steam-reforming compartment substantially parallel to the longitudinal axis of said steam-reforming compartment;
  (d) one insulation layer surrounding said external compartment; and, optionally,
  (e) one or more elongated internal gas oxidation compartment(s) positioned in said steam-reforming compartment substantially parallel to the longitudinal axis of said gas steam-reforming internal compartment, and comprising an inlet, an outlet and packed oxidation catalyst particles, said inlet and outlet being located each at an extremity of said internal gas oxidation compartment(s);
(ii) supplying a mixture comprising said natural gas and air to said gas oxidation compartment(s) of said reformer; and
(iii) supplying a mixture comprising said natural gas and water to said gas steam-reforming compartment, wherein the water-to-gas molar ratio is of between 2 and 4, and wherein the water may be pre-vaporized before being supplied into said gas steam-reforming compartment;
thereby producing hydrogen suitable to be directly fed into a power generating device (PGD) to generate an electrical power, or to be stored into a suitable container before further use.

In one embodiment of the process of the invention, the natural gas is methane.

In a further embodiment of the process of the invention, the autothermal heat exchanger APBMR has a power output of between about 80% and 120% of the PGD power output, an overall methane-to-hydrogen conversion efficiency of between about 55% and about 95%, this APBMR being operated at a temperature of between 450° C. and 750° C.

In another embodiment of the process of the invention, the PGD power output is of between about 0.1 kW and about 10 kW.

In yet another embodiment of the process of the invention, the PGD is a polymer electrolyte membrane full cell (PEMFC) stack.

In yet another embodiment of the process of the invention, the power efficiency of the PGD is about 0.6 and the autothermal heat exchanger APBMR has a volumetric power density of between about 0.5 kW/L and about 2 kW/L, more preferably between about 0.7 kW/L and about 1.5 kW/L, and more preferably between about 0.9 kW/L to about 1.1 kW/L.

In yet another embodiment of the process of the invention, the hydrogen produced comprises less than about 50 ppm of CO, preferably less than about 10 ppm of CO, and more preferably less than 5 ppm of CO.

In yet another embodiment of the process of the invention, the autothermal packed-bed membrane reformer is operated in a normal operation mode.

In yet another embodiment of the process of the invention, the autothermal packed-bed membrane reformer is operated in a reverse flow operation mode.

In yet another embodiment of the process of the invention, the autothermal packed-bed membrane reformer is operated in a counter-current oxidative low operation mode.

In yet another embodiment of the process of the invention, the autothermal packed-bed membrane reformer is additionally operated in a recycling operation mode.

According to a further aspect, the invention relates to an autothermal heat exchanger packed-bed membrane reformer (APBMR) comprising:
(a) an elongated external gas oxidation compartment comprising an inlet, an outlet and packed oxidation catalyst particles, said inlet and outlet being located each at one extremity of said external gas oxidation compartment;
(b) an elongated internal gas steam-reforming compartment comprising an inlet, an outlet and packed steam-reforming catalyst particles, said inlet and outlet being located each at one extremity of said internal gas steam-reforming compartment;
(c) one or more hydrogen-separating membrane(s) positioned into said steam-reforming compartment, substantially parallel to the longitudinal axis of said steam-reforming compartment;
(d) one insulation layer surrounding said external compartment; and optionally
(e) one or more elongated internal gas oxidation compartment(s) positioned into said steam-reforming compartment, substantially parallel to the longitudinal axis of said gas steam-reforming internal compartment, and comprising an inlet, an outlet and packed oxidation catalyst particles, said inlet and outlet being located each at one extremity of said internal gas oxidation compartment(s).

In one embodiment of the autothermal heat exchanger APBMR of the invention, the external gas oxidation compartment and the internal gas steam-reforming compartment are made of two concentric hollow tubes.

In a further embodiment of the autothermal heat exchanger APBMR of the invention, the APBMR is characterized by a length-to-diameter ratio of between about 3 to about 8, preferably from about 4 to about 6, the length and diameter being taken from the external side of the external gas oxidation compartment (i.e. without the insulation layer).

In another embodiment of the autothermal heat exchanger APBMR of the invention, the APBMR is characterized by a length of between about 10 cm and 150 cm, preferably between about 20 cm and 70 cm, and more preferably about 30 cm and 50 cm.

In yet another embodiment of the autothermal heat exchanger APBMR of the invention, the APBMR is characterized by an insulation layer having a thickness of about 2 cm to 15 cm.

In yet another embodiment of the autothermal heat exchanger APBMR of the invention, both the oxidation catalyst particles and the steam-reforming particles are spherical pellets of between about 1 mm and 10 mm diameter.

In yet another embodiment of the autothermal heat exchanger APBMR of the invention, the oxidation catalyst particles are Pt/Al2O3 or Pd/Al2O3 pellets.

In yet another embodiment of the autothermal heat exchanger APBMR of the invention, the steam-reforming catalyst particles are Ni/Al2O3 pellets.

In yet another embodiment of the autothermal heat exchanger APBMR of the invention, the hydrogen selective membranes are Pd—Ag membranes selected from the group consisting of Pd—Ag foil membranes and Pd—Ag thin films membrane coated on ceramic tubes, stainless steel tubes, or Inconel® tubes.

According to another aspect, the invention relates to a system which converts natural gas into hydrogen and provides a source of electrical power. This system comprises:
  (a) an autothermal heat exchanger packed-bed membrane reformer suitable to convert natural gas into hydrogen, a part of said gas being combusted to provide heat; and
  (b) a power generating device suitable to convert a source of hydrogen into an electrical power.

According to yet another aspect, the invention relates to a method for manufacturing and determining the structural and functional characteristics of an autothermal heat exchanger packed-bed membrane reformer (APBMR) as defined above, according to a power generating device (PGD) having a determined power efficiency and a determined power output. This method comprises the steps of:
  (i) determining the oxidation gas (OG) and steam-reforming gas (SRG) feed flow rates according to the PGD power efficiency, the PGD power output, and a component p1;
  (ii) determining the water feed flow rate by using the SRG feed flow rate of (i) according to a water-to-SRG molar ratio of between about 2 and about 4;
  (iii) determining the air feed flow rate according to the OG feed flow rate calculated in (i) and a component p2;
  (iv) determining the operation pressure in the hydrogen-separating membranes according to the physical and chemical characteristics of the membranes and a component p3;
  (v) determining the operation pressure in the steam-reforming compartment according to the physical and chemical characteristics of the hydrogen-separating membranes and a component p4;
  (vi) determining the hydrogen-separating membranes overall area according to the physical and chemical characteristics of the hydrogen-separating membranes and a component p5;
  (vii) determining the weight of oxidation catalyst particles to be packed according to the physical and chemical properties of the oxidation catalyst particles and a component p6;
  (viii) determining the weight of steam-reforming catalyst particles to be packed according to the physical and chemical properties of the steam-reforming catalyst particles and a component p7;
  (ix) determining the volume of the APBMR, a volume of 1 L corresponding to 1 kg of the combined weight of the oxidation catalyst particles and the steam-reforming catalyst particles;
  (x) determining the dimension of the APBMR, knowing that a length to diameter ratio should be of between about 3 to about 8, preferably between about 4 to about 6; and
  (xi) manufacturing a reformer according to the structural and functional characteristics defined from (i) to (x).

The manufactured APBMR has a power output of between about 80% and about 120% of the PGD power output, an overall methane-to-hydrogen conversion efficiency of between about 55% and about 95%, and has to be operated at a temperature of between 450° C. and 750° C.

The components p1 to p7 are defined as follows:

$$p1 \equiv MU = \frac{F_{mf}^{Ox}}{F_{mf}^{SR}} = \frac{F_{mf}^{Ox} \eta^{FC}}{K_1 P}$$

wherein:
MU is the methane utilization (dimensionless);
$F_{mf}^{Ox}$ is the methane feed flow rate in the MOx compartment (mol/s);
$F_{mf}^{SR}$ is the methane feed flow rate in the MSR compartment (mol/s);
$\eta^{FC}$ is the PGD overall efficiency (dimensionless);
$K_1$ is the conversion/correction factor ($K_1$=0.00115 mol/kJ); and
P is the power of the PGD (kW);

$$p2 \equiv y_{mf}^{Ox} = \frac{F_{mf}^{Ox}}{F_{tf}^{Ox}} = \frac{F_{mf}^{Ox}}{F_{mf}^{Ox} + F_{air,f}^{Ox}}$$

wherein:
$y_{mf}^{Ox}$ is the methane molar fraction of the MOx compartment feed (dimensionless);
$F_{mf}^{Ox}$ is the methane feed flow rate in the MOx compartment (mol/s);
$F_{tf}^{Ox}$ is the total feed flow rate in the MOx compartment (mol/s);
$F_{mf}^{Ox}$ is the methane feed flow rate in the MOx compartment (mol/s); and
$F_{air,f}^{Ox}$ is the air feed flow rate in the MOx compartment (mol/s);

$$p3 = P_t^M$$

wherein:
$P_t^M$ is the operation pressure within the hydrogen separating membrane (bar);

$$p4 = P_t^{SR}$$

wherein:

$P_t^{SR}$ is the operation pressure within the MSR compartment (bar);

$$p5 \equiv Pe_M = \frac{K_5 P}{S^M \sqrt{P_t^{SR}} (1 - P_t^M / P_t^{SR}) A_M \exp(-E_M / 7.67) \eta^{FC}}$$

wherein:

$Pe_M$ is the membrane Peclet number (dimensionless);

$K_5$ is the conversion/correction factor ($K_5 = 0.00111$ mol/kJ);

P is the power of the PGD (kW);

$S^M$ is the membrane area (m²);

$P_t^{SR}$ is the operation pressure within the MSR compartment (bar);

$P_t^M$ is the operation pressure within the hydrogen separating membrane (bar);

$A_M$ is the membrane permeability to hydrogen (mol/(m² s bar^{0.5}));

$E_M$ is the membrane activation energy (kJ/mol); and $\eta^{FC}$ is the PGD overall efficiency (dimensionless);

$$p6 \equiv Pe_M Da_{SR} = \frac{W_c^{SR}}{P_t^{SR} S^M} \frac{A_{SR}}{A_M} \exp\left(\frac{E_M - E_{SR}}{7.67}\right)$$

wherein:

$Pe_M$ is the membrane Peclet number (dimensionless);

$Da_{SR}$ is the SR Damköhler number (dimensionless);

$W_c^{SR} \equiv \rho_c (1-\epsilon) V^{SR}$ is the SR catalyst weight (kg) wherein:

$\rho_c$ is the catalyst density (kg/m³);

$\epsilon$ is the void fraction of the packed bed (dimensionless); and $V^{SR}$ is the packed bed volume in the MSR compartment (m³);

$P_t^{SR}$ is the operation pressure within the MSR compartment (bar);

$S^M$ is the membrane area (m²);

$A_M$ is the membrane permeability to hydrogen (mol/(m² s bar^{0.5}));

$A_{SR}$ is the SR reaction rate coefficient ((mol MPa^{0.5})/(s kg));

$E_M$ is the membrane activation energy (kJ/mol); and $E_{SR}$ is the SR reaction activation energy (kJ/mol);

$$p7 \equiv Da_{Ox} = \frac{W_c^{Ox}}{F_{mf}^{Ox}} A_{Ox} \exp\left(\frac{-E_{Ox}}{6.01}\right)$$

wherein:

$Da_{Ox}$ is the Ox Damköhler number (dimensionless);

$W_c^{Ox} \equiv \rho_c (1-\epsilon) V^{Ox}$ is the Ox catalyst weight (kg) wherein:

$\rho_c$ is the catalyst density (kg/m³);

$\epsilon$ is the void fraction of the packed bed (dimensionless); and $V^{Ox}$ is the packed bed volume in the MOx compartment(s) (m³);

$F_{mf}^{Ox}$ methane feed flow rate in the MOx compartment (mol/s);

$A_{Ox}$ is the Ox reaction rate coefficient (mol/(s kg)); and $E_{Ox}$ is the Ox reaction activation energy (kJ/mol).

Each value of p1 to p7 for steps (i) to (x) should be chosen according to the mode of operation of the APBMR, in a range of values given in one of the following tables:

| OM/pi | p1 | p2 | p3 (bar) | p4 (bar) | p5 | p6 | p7 |
|---|---|---|---|---|---|---|---|
| N | 0.40-0.85 | 0.065-0.080 | 0.01-1 | 5-30 | 0.02-0.08 | 5-25 | 50-250 |
| R | 0.05-0.60 | 0.045-0.065 | 0.01-1 | 5-30 | 0.02-0.08 | 5-25 | 50-250 |
| RF | 0.10-0.70 | 0.030-0.055 | 0.01-1 | 5-30 | 0.02-0.08 | 5-25 | 50-200 |
| CCOxF | 0.10-0.70 | 0.030-0.055 | 0.01-1 | 5-30 | 0.02-0.08 | 5-25 | 50-200 |
| RF + R | 0.05-0.60 | 0.030-0.055 | 0.01-1 | 5-30 | 0.02-0.08 | 5-25 | 50-200 |
| CCOxF + R | 0.05-0.60 | 0.030-0.055 | 0.01-1 | 5-30 | 0.02-0.08 | 5-25 | 50-200 | or

| OM/pi | p1 | p2 | p3 (bar) | p4 (bar) | p5 | p6 | p7 |
|---|---|---|---|---|---|---|---|
| N | 0.50-0.65 | 0.065-0.070 | 0.01-3 | 3-20 | 0.02-0.08 | 5-10 | 10-25 |
| R | 0.15-0.40 | 0.045-0.055 | 0.01-3 | 3-20 | 0.02-0.08 | 5-10 | 10-25 |
| RF | 0.20-0.50 | 0.030-0.045 | 0.01-3 | 3-20 | 0.02-0.08 | 5-10 | 10-20 |
| CCOxF | 0.20-0.50 | 0.030-0.045 | 0.01-3 | 3-20 | 0.02-0.08 | 5-10 | 10-20 |
| RF + R | 0.15-0.40 | 0.030-0.045 | 0.01-3 | 3-20 | 0.02-0.08 | 5-10 | 10-20 |
| CCOxF + R | 0.15-0.40 | 0.030-0.045 | 0.01-3 | 3-20 | 0.02-0.08 | 5-10 | 10-20 |

BRIEF DESCRIPTION OF THE DRAWINGS

The above and other characteristics and advantages of the invention will be more readily apparent through the following examples, and with reference to the appended drawings, wherein:

FIG. 4B is a cross sectional view along line B-B of the embodiment of the apparatus of the invention shown in FIG. 4A;

FIG. 4C is a cross sectional view of one embodiment of the apparatus of the invention, which comprises several internal MOx compartments;

DETAILED DESCRIPTION OF THE INVENTION

Figure 1:
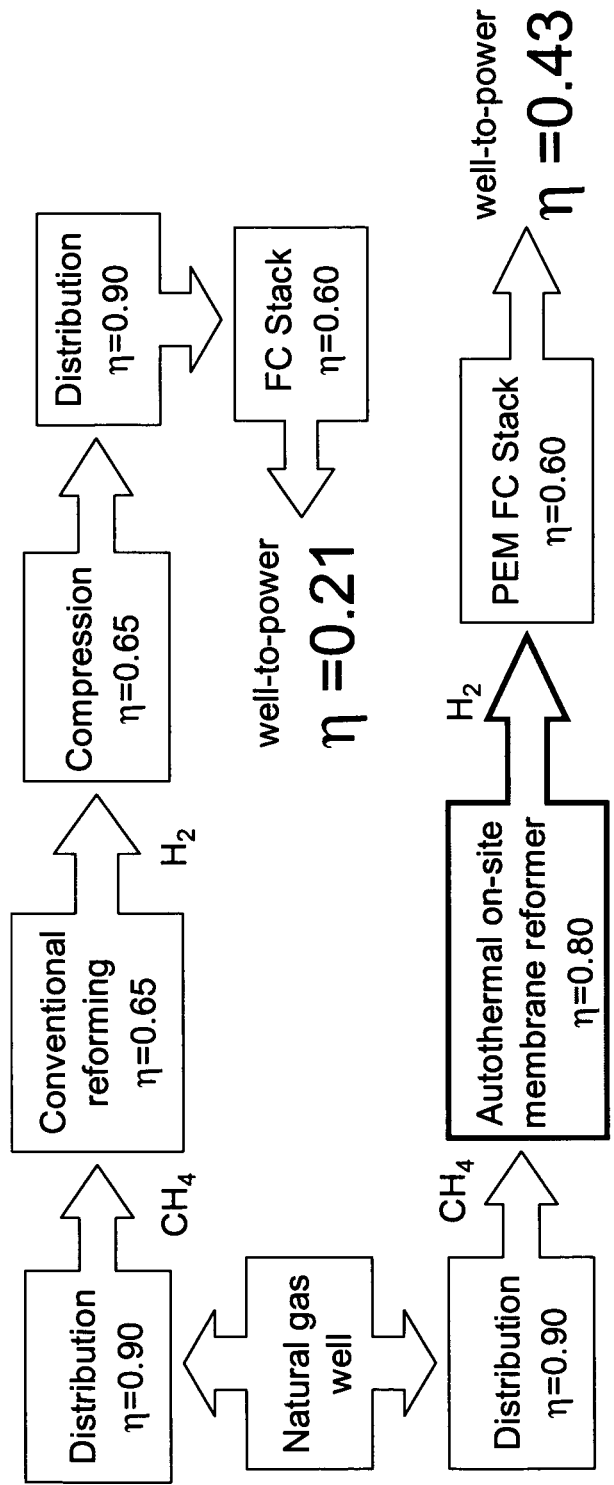
FIG. 1 schematically shows the energy transformation/distribution efficiency of a path using conventional centralized hydrogen generation with further distribution, and of a path using on-site hydrogen generation via an autothermal membrane reformer.
Figure 2:
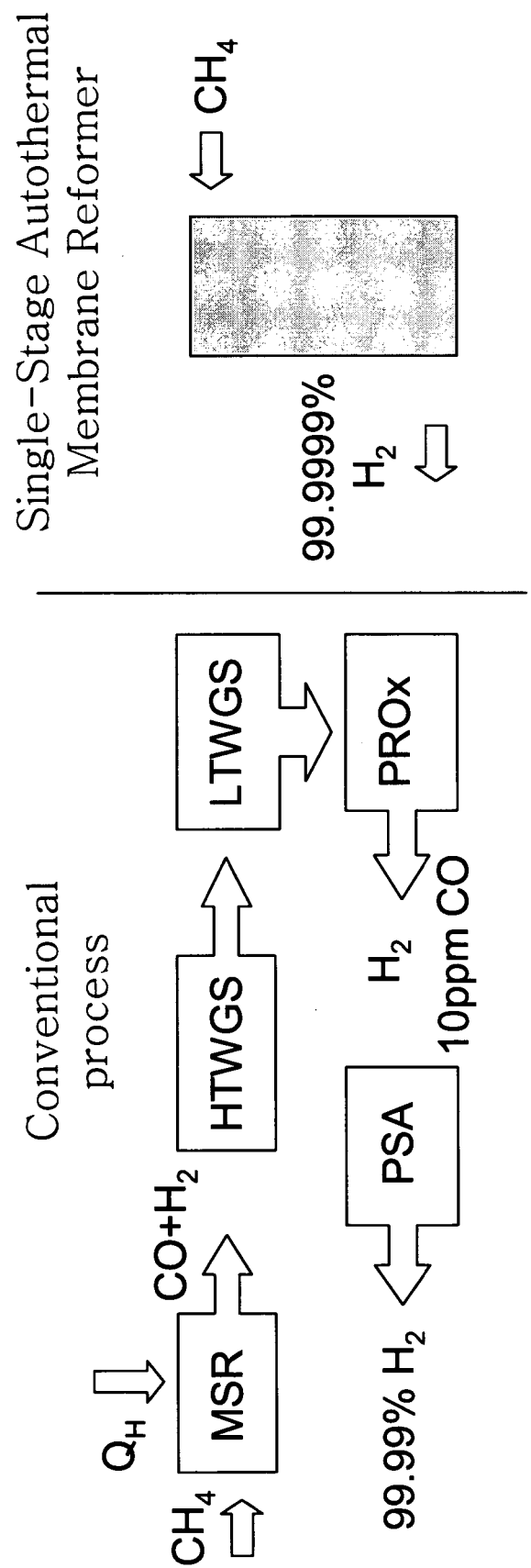
FIG. 2 schematically shows the steps performed in a conventional multi-stage steam-reforming plant for the production of hydrogen, and the step performed in a single-stage autothermal membrane reformer.

The present invention relates to a method for producing hydrogen, to a compact apparatus for autonomous generation of hydrogen from natural gas via membrane-assisted steam-reforming, which is thermally coupled to catalytic combustion, and to a system capable of producing electric power via the conversion of natural gas into hydrogen and the oxidation of said hydrogen in a power generating device (PGD). The apparatus of the invention significantly improves the efficiency of the natural gas-to-hydrogen conversion and the power density of the hydrogen production unit. The apparatus of the invention can be used on-site, i.e. on the site where the natural gas is extracted, or on-board, i.e. loaded into an apparatus or system (such as vehicles) comprising a source of natural gas.

The apparatus of the present invention relies on concepts inherent to catalytic membrane reactors and autothermal reforming but also includes novel and innovative approaches regarding heat integration. More specifically, the apparatus of the inventions is a heat-exchanger bed membrane reformer, wherein MSR and MOx are carried out in distinct but adjacent compartments. This configuration avoids dilution of the reactive mixture by nitrogen on one hand, and provides an efficient heat supply from the exothermic (MOx) bed to the endothermic (MSR) compartment on the other hand. Heat recuperation by reverse flow and oxidative counter-current flow, as well as recycling of MSR effluent (combustion of unreacted and unseparated compounds in the MOx compartment), may be used to provide an additional gain in terms of energy conversion efficiency.

The hydrogen produced by the reformer of the present invention is ultrapure and, therefore, may be directly fed to any device, machine, apparatus, or system which necessitates hydrogen, such as power generating devices, for instance to a proton exchange membrane fuel cells (PEMFC) stack. The direct delivery of hydrogen to the PGD avoids the loss of energy due to transportation, storage and distribution of hydrogen. Currently, among the various types of existing fuel cell, PEMFCs present several advantages such as high reliability, long run time (>10000 h), and high power density (>1 kW/L), and provide zero-emission solutions ($CO_2$, CO, $NO_x$, particle and noise) for a wide range of applications, such as residential power, back power (when the grid is either unavailable or unreliable), APU (auxiliary power units), UPS (uninterrupted power supply) and automotive applications. While the examples included in the present application merely focus on hydrogen delivery to PEMFCs, it should be emphasized that any other device that necessitates hydrogen, in particular other power generating device using hydrogen as a source, may be used in connection with the apparatus of the invention.

As used therein, the term "reformer" refers to a steam methane catalytic reformer, i.e. an apparatus suitable to produce hydrogen by reacting methane and water.

As used therein, the term "membrane reformer" refers to a reformer which employs hydrogen selective membranes for separating hydrogen molecules from the environment in which they are produced.

As used therein, the term "packed-bed reformer" refers to a reformer which employs one or more hollow tubes in which solid catalyst particles are packed, and serve as a reaction surface on which the methane steam-reforming process and/or the methane oxidation process are performed.

As used therein, the term "autothermal reformer" and "autonomous reformer" refer to a reformer in which methane steam-reforming (an endothermic reaction) is coupled to an exothermic reaction (e.g. methane oxidation), either directly ("direct coupling") on the same catalytic bed, or indirectly ("indirect coupling") via heat exchange.

As used therein, the term "heat exchanger reformer" refers to a reformer in which the heat generated by an exothermic reaction (e.g. methane oxidation) in one or more compartment(s) of the reformer, is spontaneously transferred to one or more adjacent compartment(s), wherein the methane steam-reforming reaction (endothermic reaction) takes place.

As used therein, the term. "counter-current flows" and "co-current flows" refer to the direction of the gas flows in the MSR and MOx compartments of the reformer. When these flows are oriented in the same direction, they are "co-current"; otherwise they are in "counter-current".

As used therein, the term "recycle flow" refers to the mode of operation when the SR compartment effluent is fed to the Ox compartment.

As used therein, the term "operation window" refers to a set of values of parameters of the reformer (flow rates of methane and air, etc.) that provides the desired power output and the desired methane-to-hydrogen overall conversion efficiency of the reformer.

As used therein, the term "energy conversion efficiency" refers to the ratio between the energy contents of the useful output and the input of an energy conversion apparatus. More particularly, the energy conversion efficiency of the reformer of the invention is defined as the ratio between the energy contents of the separated hydrogen output and the overall methane input calculated using lower heating values (LHV).

As used therein, the term "power density" refers to the amount of power per unit volume (volumetric power density) or weight (gravimetric power density). More particularly, the power density of the reformer of the invention is defined as the electrical power output of the downstream power generation device per unit volume of the reformer (not including an insulation layer).

As used therein, the term "compact reformer" refers to a reformer having a length of between about 10 cm and about 150 cm, preferably between about 20 cm and about 70 cm, and more preferably between about 30 cm and about 50 cm, and a diameter of between about 2 cm and about 50 cm, preferably between about 3 cm and about 25 cm, and more preferably between about 4 cm and about 15 cm.

As used therein, the term "power generating device (PGD)" refers to a machine, device, or apparatus, which is able to produce an electrical power via the consumption of hydrogen.

The apparatus of the present invention is a compact autonomous methane membrane reformer, for which an optimized design, geometry, and operation window is defined according to the required power output of the power generating device (PGD) to which it is connected. As mentioned previously, it should be appreciated that, while the reformer of the invention may be used for instance for feeding fuel cells with hydrogen, other hydrogen requiring devices may be also used with the reformer of the invention. For instance, the hydrogen produced via the reformer of the invention is suitable for generating power via polymer electrolyte membrane fuel cell (PEMFC) stacks in the range of about 0.1 kW to about 10 kW.

The reformer of the invention is designed for continuous operation without any external heat supply. To ignite the reformer, a narrow zone at the reactor entrance should be heated to the methane ignition temperature (~400-450° C.), as it may be done by a standard electrical heater. There is no need to heat up the whole reformer, since raising temperature to the ignition limit at the reformer entrance should send a pulse of heat that moves downstream and heats the whole reactor. The pulse exists due to the exothermic MOx reaction and moves downstream due to the inlet stream of feed.

Structurally speaking, the reformer of the invention comprises at least three distinct sections: a methane oxidation catalytic bed, a methane steam-reforming catalytic bed and hydrogen separation membranes. The reformer of the invention produces extra-pure hydrogen comprising less than about 50 ppm of CO, preferably less than about 10 ppm of CO, and more preferably less than about 5 ppm of CO. The hydrogen flow output of the reformer of the invention, per 1 L of reactor (reactor's volume), is of about 5 NL/min to about 20 NL/min, more preferably about 7 NL/min to about 15 NL/min, and more preferably about 9 NL/min to about 11 NL/min. In other words, the reformer of the invention has a volumetric power density of about 0.5 kW/L to about 2 kW/L, more preferably about 0.7 kW/L to about 1.5 kW/L, and more preferably about 0.9 kW/L to about 1.1 kW/L. Herein, the volumetric power density is calculated assuming that the downstream PGD is a fuel cell stack with the efficiency of $\eta^{FC}=0.6$ (hydrogen-to-electrical power conversion), and by using the following equation (eq.5):

$$P = \eta^{FC} \Delta G^{FC} F_{H_2,out}^M \quad (5)$$

wherein

P [kW] is the PEMFC power output;

$F_{H_2,out}^M$ [mol/s] is the reformer output molar flow rate of hydrogen ($F_{H_2,out}^M = (1/22.4/60) Q_{H_2,out}^M$ [NL/min]); and $\Delta G^{FC} = 237$ kJ/mol is the Gibbs Free Energy of the fuel cell hydrogen oxidation reaction.

Figure 3A:
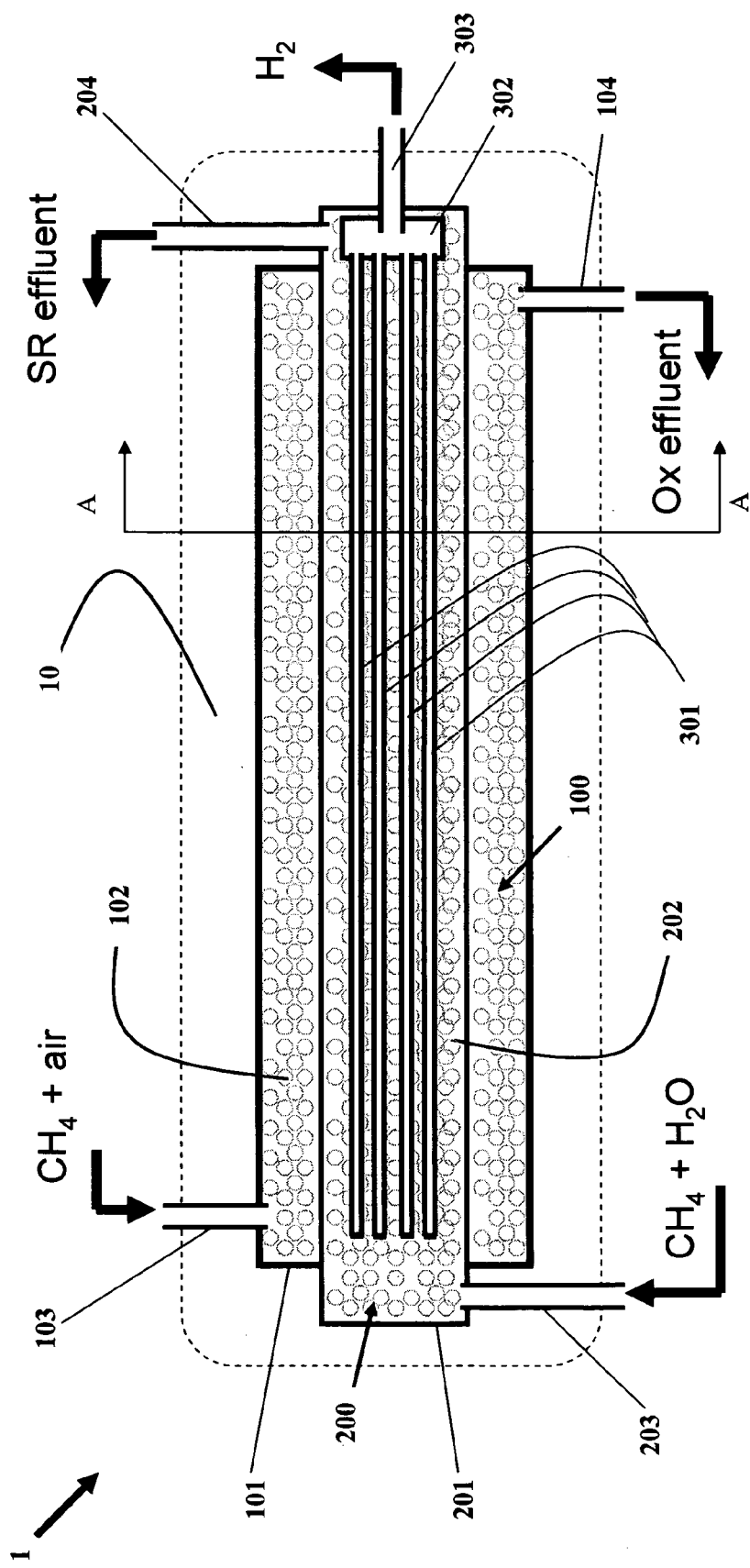
FIG. 3A is a longitudinal cross-sectional view showing an embodiment of the apparatus of the invention.
Figure 3B:
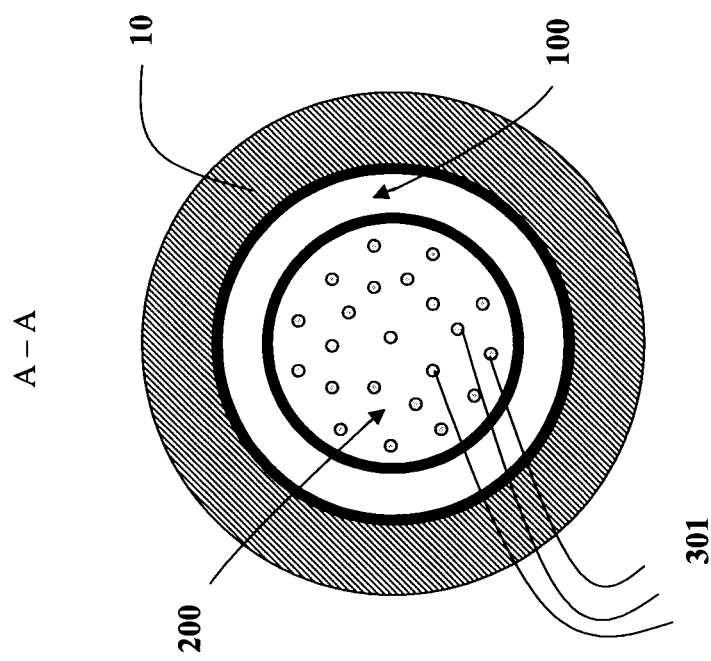
FIG. 3B is a cross sectional view along line A-A of the embodiment of the apparatus of the invention shown in FIG. 3A.

FIGS. 3A and 3B schematically show a longitudinal and a cross-sectional view of an embodiment of the reformer of the invention. The reformer 1 is composed of at least two elongated concentric compartments, namely the MOx compartment 100 and the MSR compartment 200, which are defined by two or more hollow tubes 101 and 201 made of stainless steel (e.g. 316 SS) or any other suitable material. The methane steam-reforming (MSR) reaction takes place in the internal tube whereas the external tube is dedicated to methane oxidation (MOx). The MOx compartment 100 and the MSR compartment 200 have both an inlet (103, 203) and an outlet (104, 204) being located each at one extremity of the compartment (inlet and outlet of the MOx compartment may be inverted in some operation modes, see reverse flow operation mode described below). Both tubes 101 and 201 are packed with appropriate catalyst particles, such as spherical pellets of about 1 mm to about 10 mm size (or particles having any other suitable shape). Spherical pellets of $Pt/Al_2O_3$ (e.g. 0.5 wt % Pt, Johnson Matthey) or $Pd/Al_2O_3$ (e.g. BASF RO-25, 0.5 wt % Pd) may be used as oxidation catalysts 102, and spherical pellets of $Ni/Al_2O_3$ (e.g. SG-9301, 16.5 wt % NiO, Engelhard; KATALCO 23-4™, Johnson Matthey) may be used as steam-reforming catalysts 202. Other suitable oxidation catalysts 102 and steam-reforming catalysts 202, with various shapes and sizes may be used as well.

The hydrogen selective membranes 301 are Pd—Ag membranes, such as Pd—Ag foil membranes (e.g. membranes from Johnson Matthey, UK), or Pd—Ag thin films membrane coated on ceramic tubes, stainless steel tubes or any other suitable material (e.g. Inconel®-supported Pd—Ag thin film tubes, REB, Research & Consulting, US). Other types of hydrogen separation membranes (e.g. zeolitic, silica) can be used as well. The hydrogen selective membranes 301 are placed into the MSR compartment, substantially parallel to the longitudinal axis of said MSR compartment.

The number of hydrogen selective membranes 301 installed in the MSR compartment 200 is defined according to the aimed hydrogen output or the desired fuel cell power output, namely one membrane for about 0.1 to about 1 NL/min of $H_2$ output or one membrane for about 10 W to about 100 W fuel cell power output. Each membrane 301 comprises a dead-end extremity, the other extremity being brazed into a stainless steel tube sheet, which is fitted to standard fittings, such as Let-Lok® fittings (HamLet) or any other suitable fittings. All the membranes 301 installed in the MSR compartment are attached to a collector 302 connected to the outlet hydrogen line 303.

The external compartment, namely the MOx compartment 100, is covered with an insulation layer 10 of from about 2 cm to about 15 cm thickness made of, but not limited to, ceramic material sieves such as alumina, or of a porous matrix, which aims to reduce heat losses from the reformer. Any other suitable insulation layer may be used as well.

Methane and air are supplied to the MOx compartment 100, wherein catalytic methane combustion is carried out, providing the necessary heat source to the MSR compartment 200. Methane and water are supplied to the MSR compartment 200, wherein hydrogen is produced via a steam-reforming process. Water is supplied according to the stoichiometry of the overall MSR reaction (Eq. 3), i.e. the water-to-methane molar ratio of the MSR feed flow rates should be at least about 2, but not higher than about 4, to prevent dilution of the reactive stream. Optionally, the water may go through a pre-vaporizer prior to mixing with methane. Advantageously, the pre-vaporizer may use the heat coming from the MOx or MSR effluent to vaporize the water.

Figure 4A:
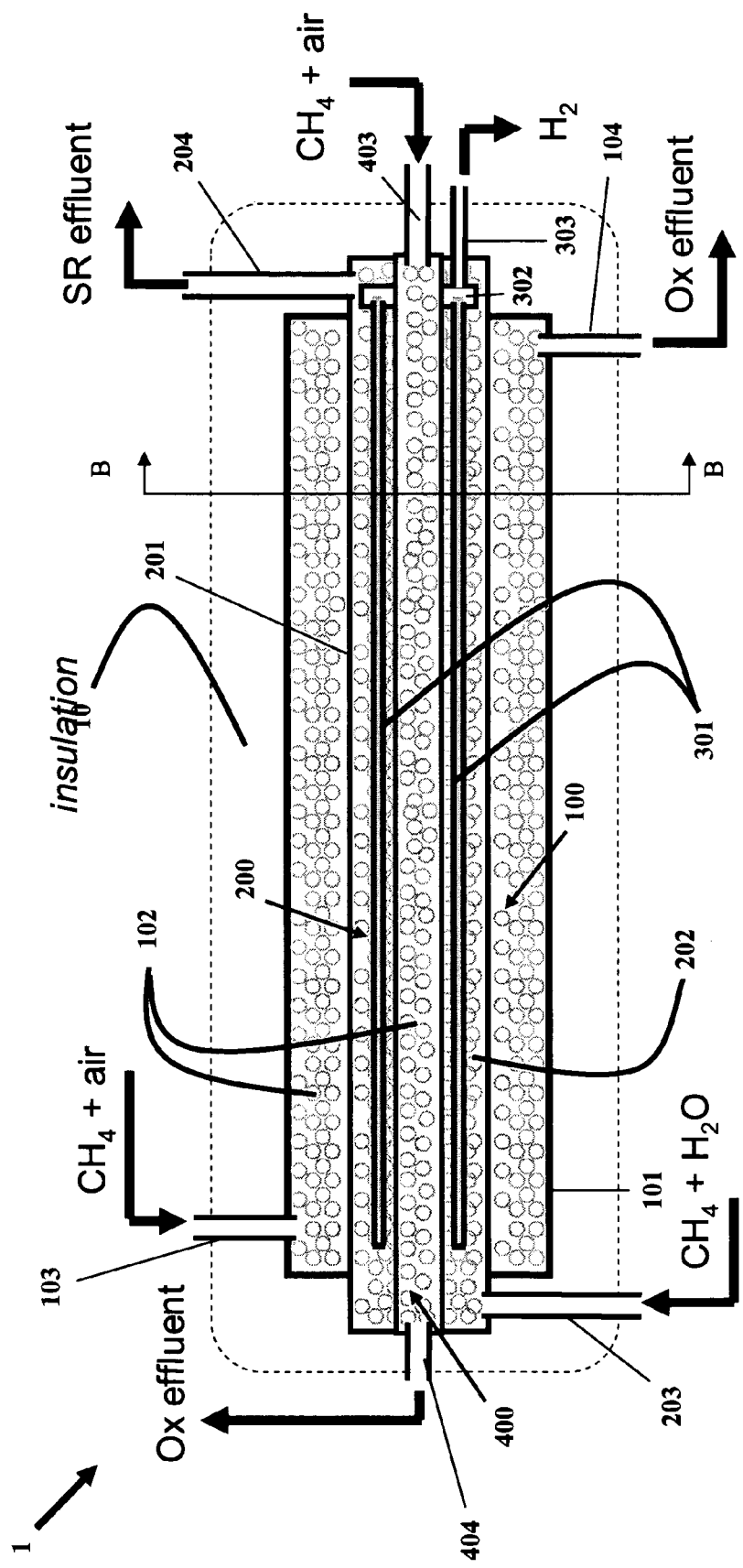
FIG. 4A is a longitudinal cross-sectional view showing one embodiment of the apparatus of the invention, which comprises an internal MOx compartment.
Figures 5A, 5B:
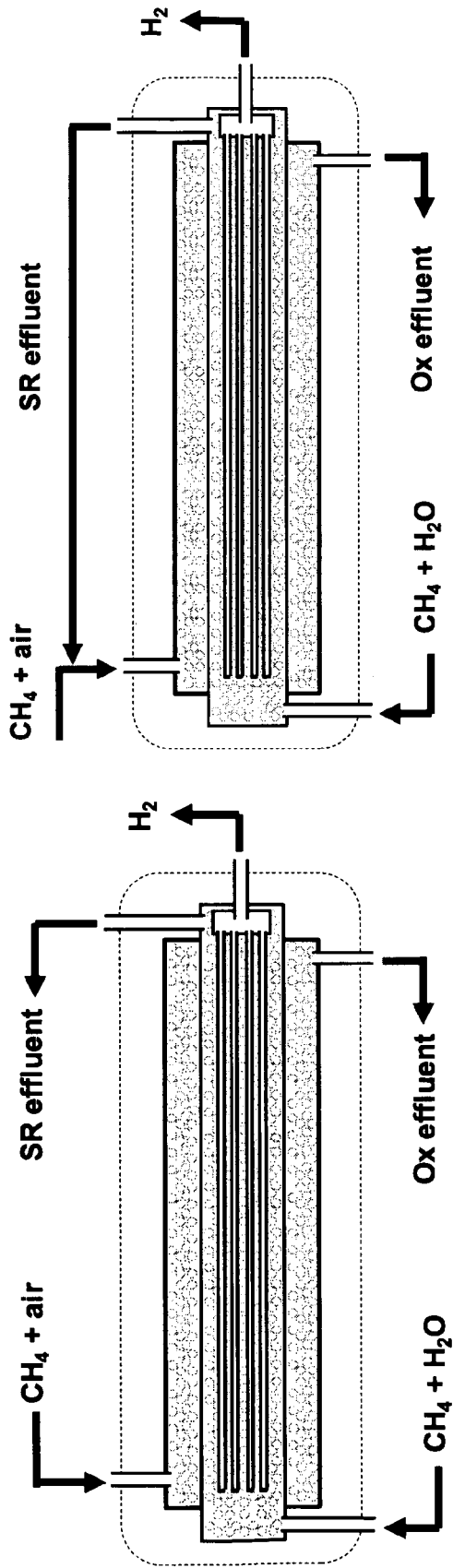
FIGS. 5A-5D schematically shows the principle of four different modes of operation of the apparatus of the invention.
Figures 5C, 5D:
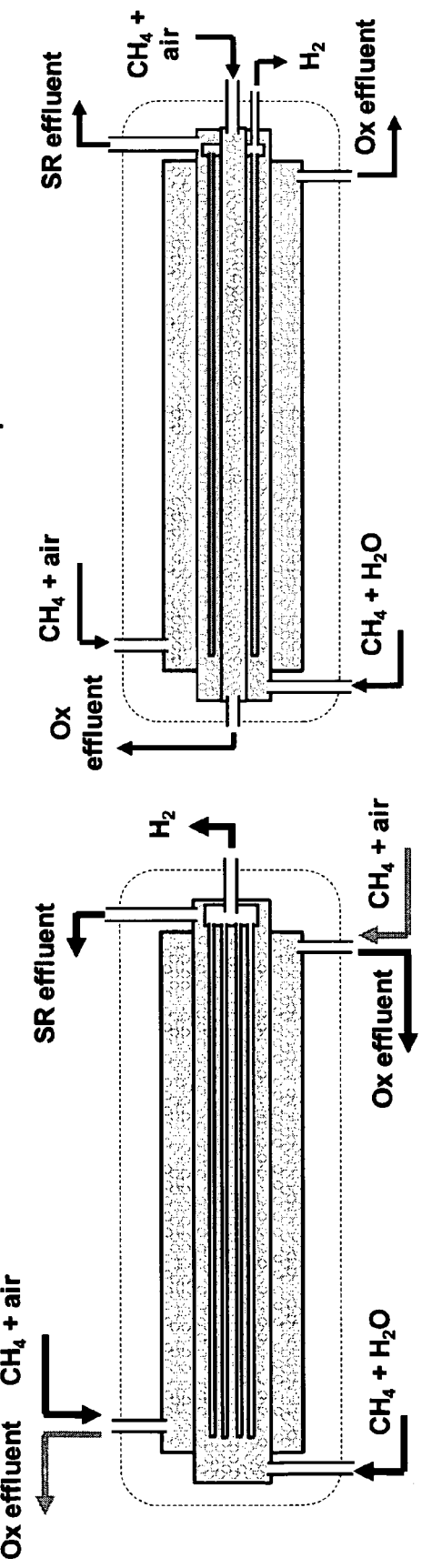

FIGS. 4A-4C show two other embodiments of the reformer of the invention, in which one (FIG. 4B) or more (FIG. 4C) elongated internal MOx compartments 400 have been installed within the MSR compartment 200, having an inlet 403 and an outlet 404 located each at one extremity.

FIGS. 5A-5D show different mode of operation of the reformer of the invention. These modes of operation (MO) are described below.

In the "normal (N) operation" mode (FIG. 5A), methane and ambient air are supplied to the Ox compartment 100. Simultaneously, methane and liquid water are supplied to the MSR compartment 200. The water may be first passed through a vaporization coil (optional), where the heat of the MOx or MSR effluent stream may be used to vaporize water. The methane catalytically oxidized in the MOx compartment 100 generates a heat which is spontaneously and continuously transferred to the MSR compartment 200, wherein it is the endothermic MSR process takes place.

In the "recycle (R) operation" mode (FIG. 5B), the gas stream effluent from the high pressure MSR compartment 200 is recycled (optionally after the water condenser) into the low pressure MOx compartment 100 for oxidation of the combustible components, namely unreacted methane, unseparated hydrogen and carbon monoxide generated during the reaction. Since the recycle stream flows from the high pressure MSR compartment 200 to the low pressure MOx compartment 100, no additional equipment is required except for the standard back pressure regulator (to keep high pressure in the SR compartment). This approach provides more efficient methane utilization, since it allows complete methane conversion. Indeed, while MOx is not limited by equilibrium, MSR is an equilibrium-limited process that normally exhibits incomplete methane conversions (even when using efficient membrane reactors).

When the SR effluent is recycled and combusted, the overall reformer methane conversion is always complete, independently on the MSR conversion. Moreover, for low MSR conversions, applying the recycle operation mode provides more heat, which in turn increases the MSR conversion.

The "Reverse Flow (RF) operation" mode (FIG. 5C), is another approach for increasing energy conversion (methane-to-hydrogen) efficiency of the reformer, by heat recuperation. It is done by alternating the flow direction in the MOx compartment 100, with a certain switch time, such that the reactor edges stay at relatively low temperature. During the normal operation or recycle operation, a significant amount of heat is continuously released to the environment with the MOx effluent stream. This enthalpy is particularly significant for small methane Ox feed concentrations (high total Ox feed flow rates). During the reverse flow operation, the Ox effluent stream leaves the reformer 1 at a relatively low temperature, reducing the amount of heat released to the environment. Then, higher reformer temperatures can be achieved for a given methane inlet flow rate. Moreover, reverse flow operation leads to more effective temperature distribution along the reactor. Normal co-current operation with a constant flow direction results in a diminishing along the reactor temperature profile due to the heat losses and endothermic (SR) reaction. Reverse flow operation normally leads to a temperature distribution that is characterized by low temperatures at the ends and high temperature for most of the reactor, with no significant temperature gradients along this hot area. For normal operation, the SR reactions and the hydrogen separation rates drop along the reactor as the temperature declines. For reverse flow operation, the reactions and separation rates are higher along the reactor, since most of the reactor is at high and similar temperature.

The "Counter-Current Oxidative Flow (CCOF) operation" mode (FIG. 5D), is proposed as an improvement of the reverse flow operation mode. The reverse flow operation mode requires a control scheme with a feed-back control to assure safe operation in order to avoid run-aways or spontaneous ignitions and prevent extinctions. Furthermore, an appropriate switch time has to be determined. The counter-current oxidative flow operation mode provides the heat recuperation advantages of the reverse flow operation mode but does not require switching the flow direction. Instead, the oxidative stream, which comprises methane and air, is divided into an external oxidative flow which enters the external MOx compartment 100, and an internal oxidative flow which enters one or more internal MOx compartment(s) 400 located within the MSR compartment 200 (see also FIGS. 4A-4C). The external and internal oxidative flows have opposite directions, i.e. operated in a counter-current mode.

A specific embodiment of the reformer of the invention comprises a combination of the recycle flow operation mode and reverse flow operation mode. This approach provides the advantages of both operation modes without rising specific drawbacks or adding further in the reactor design. Another embodiment of the reformer of the invention comprises a combination of the counter current oxidative flow operation mode and of the recycle mode. This design provides the benefits of both approaches without adding any additional complexity.

Figure 6:
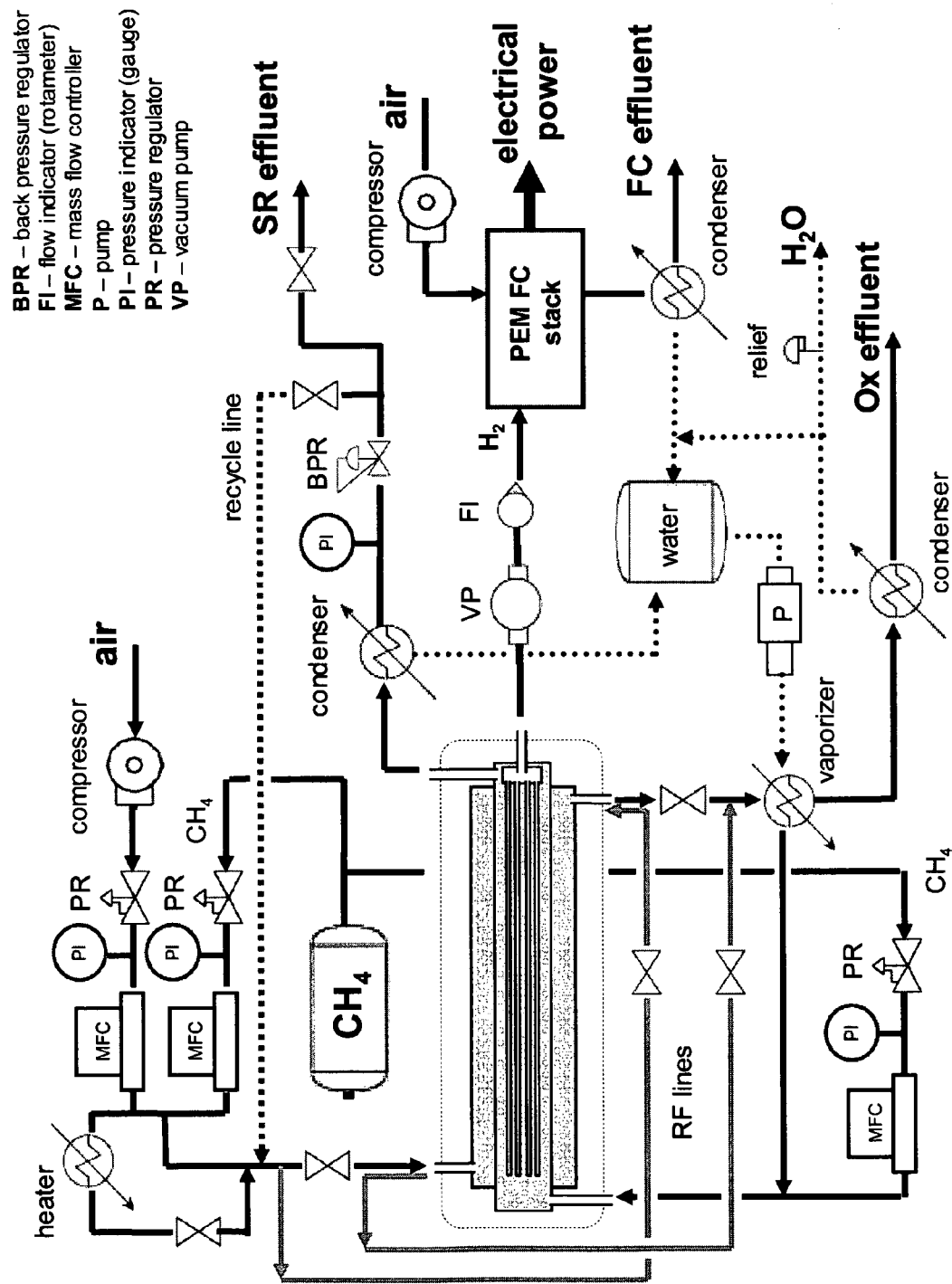
FIG. 6 schematically shows an embodiment of the system of the invention.

FIG. 6 schematically shows an embodiment of the system of the invention. The overall power generation system should include an autothermal membrane reformer that converts methane to hydrogen, while part of the methane is combusted to provide heat using ambient air as an oxidizer, and a power generating device (PGD), for instance a PEMFC stack, that generates electricity from the hydrogen provided by the reformer. The system of the invention may further comprise one or more of the following elements: one or more air compressors for supplying to the reformer and the PGD; pressure reducers and flow controllers for regulating the feed flow rates of methane and air; a back pressure regulator to keep high pressure in the steam-reforming compartment of the reformer; a liquid water storage tank (optionally for water re-circulated from the reformer and fuel cell stack outlet); a water pump for supplying water to the steam-reforming compartment of the reformer; water condensers; a water pre-evaporator; pressure relief valves to insure safe operations; and a vacuum pump for diminishing pressure in the membrane interior for acceleration hydrogen separation.

When used in recycling mode, in which the MSR effluent is recycled into the MOx compartment to produce heat via combustion, the reformer of the system of the invention achieves an overall complete methane conversion, even if the conversion in the MSR compartment is not complete; the products of the reformer in this case are hydrogen, water and carbon dioxide (i.e. no CO and NOR). If considering the overall system of the invention which comprises a reformer as described above and an electrical power generating system such as PEMFCs, methane and air are supplied to the system whereas carbon dioxide and water are released to the environment. The chemical energy conversion path of the system of the invention may be compared to the conventional combustion processes, but with a conversion efficiency of chemical energy into electrical energy which is greatly improved (which results also in the decrease of amount of $CO_2$ polluted per amount of energy generated). Furthermore, the system of the invention does not release harmful pollutants such as CO, NO and carbon particles (soot) to the environment.

The present invention also defines an optimal reformer operation window, which enables to determine, for a specific PGD power output, the optimal feed flow rates (of methane, water, and air) as well as the optimal structural characteristics of the reformer for a specific mode of operation (membrane surface area, catalysts weights, volume/size of the reformer). In other words, for a specific PGD power output, the operation window enables to reach the optimal reformer efficiency and the maximal hydrogen output rate. The operation window also takes into consideration the type of membrane and the type of catalyst that are intended to be used within the reformer. It should be also noted that the reformer of the invention can be adapted to power variations of ±50% by adjusting in real-time the feed flow rates of methane, water and air in the different compartments.

Briefly, the operation window has been built as follows:
1. Evaluation of the methane supply: The required methane SR inlet flow rate ($F_{mf}^{SR}$) is calculated (e.g. for a PGD power output (P)).
2. Evaluation of the required membrane area: For the $F_{mf}^{SR}$ calculated in (1) and for a given membrane type ($H_2$ permeation characteristics are required), the expected power output is mapped in a domain of operation temperature (T) vs. membrane area ($S^M$) and the optimal membrane area is set.
3. Evaluation of the catalyst loadings: The catalyst loadings are selected to provide sufficiently high methane conversions rates and the reformer geometry is defined considering the required separation area and minimizing pressure drop.
4. Determination of the optimal operation window: The reformer efficiency ($\eta$) and power output (P) are mapped in a domain of the methane Ox feed concentration ($y_{mf}^{Ox}$) vs. methane utilization ratio (MU, a ratio of methane Ox-to-SR feed rate), for the reformer geometry defined in (3)

Based on the procedure described above, the parameters of the vector of operation (p) have been assessed and have been used to define the vector's main components (pi, i=1, 2, 3, . . . ). The vector components are valid for all the reformer configurations, and can be used for designing a reformer with any required hydrogen output in the small-to-medium scale power generation range (about 0.1 to about 10 kW). In any cases, it is required that the power output of any reformer of the invention would be in the range of between about 80% and about 120% of the PGD power output (e.g. PEMFCs) and that the overall energy efficiency of the methane-to-hydrogen conversion in said reformer would be in the range of between about 55% and about 95%, preferably about 70% to about 95%. The operation window of the reformer is also restricted to an operation temperature range of 450° C.<T<750° C.

The power output is defined by Eq. 5 (see above) and the reformer efficiency is defined as follows (Eq.6):

$$\eta = \frac{HR}{HR_{max}}, HR = \frac{F_{H_2,out}^M}{F_{mf}^{SR} + F_{mf}^{Ox}}, HR_{max} = 3.32 \quad (6)$$

wherein
HR is the hydrogen recovery (separated hydrogen output per overall methane input);

$HR_{max}$ is the thermodynamic limit of the hydrogen recovery (calculated using the low heating values (LHV) of hydrogen and methane);
$F_{H_2,out}^M$ is the output flow rate of the separated hydrogen (mol/s);
$F_{mf}^{Ox}$ is the methane feed flow rate in the MOx compartment (molts);
$F_{mf}^{SR}$ is the methane feed flow rate in the MSR compartment (mol/s).

The vector components are defined as follows:

$$p1 \equiv MU = \frac{F_{mf}^{Ox}}{F_{mf}^{SR}} = \frac{F_{mf}^{Ox}\eta^{FC}}{K_1 P}$$

wherein:
MU is the methane utilization (dimensionless);
$F_{mf}^{Ox}$ is the methane feed flow rate in the MOx compartment (mol/s);
$F_{mf}^{SR}$ is the methane feed flow rate in the MSR compartment (mol/s);
$\eta^{FC}$ is the PGD overall efficiency (dimensionless);
$K_1$ is the conversion/correction factor ($K_1$=0.00115 mol/kJ); and
P is the power of the PGD (kW);

$$p2 \equiv y_{mf}^{Ox} = \frac{F_{mf}^{Ox}}{F_{tf}^{Ox}} = \frac{F_{mf}^{Ox}}{F_{mf}^{Ox} + F_{air,f}^{Ox}}$$

wherein:
$y_{mf}^{Ox}$ is the methane molar fraction in the MOx feed;
$F_{mf}^{Ox}$ is the methane feed flow rate in the MOx compartment (molts);
$F_{tf}^{Ox}$ is the total feed flow rate in the MOx compartment;
$F_{mF}^{Ox}$ is the methane feed flow rate in the MOx compartment (mol/s); and
$F_{air,f}^{Ox}$ is the air feed flow rate in the MOx compartment (mol/s);

$$p3 = P_t^M$$

wherein:
$P_t^M$ is the operation pressure within the hydrogen separating membrane (bar);

$$p4 = P_t^{SR}$$

wherein:
$P_t^{SR}$ is the operation pressure within the MSR compartment (bar);

$$p5 \equiv Pe_M = \frac{K_5 P}{S^M \sqrt{P_t^{SR}} (1 - P_t^M/P_t^{SR}) A_M \exp(-E_M/7.67)\eta^{FC}}$$

wherein:
$Pe_M$ is the membrane Peclet number (dimensionless);
$K_5$ is the conversion/correction factor ($K_{65}$=0.00111 mol/kJ);
P is the power of the PGD (kW);
$S^M$ is the membrane area (m²);
$P_t^{SR}$ is the operation pressure within the MSR compartment (bar);

$P_t^M$ is the operation pressure within the hydrogen separating membrane (bar);
$A_M$ is the membrane permeability to hydrogen (mol/(m² s bar$^{0.5}$));
$E_M$ is the membrane activation energy (kJ/mol); and
$\eta^{FC}$ is the PGD overall efficiency (dimensionless);

$$p6 \equiv Pe_M Da_{SR} = \frac{W_c^{SR}}{P_t^{SR} S^M} \frac{A_{SR}}{A_M} \exp\left(\frac{E_M - E_{SR}}{7.67}\right)$$

wherein:
$Pe_M$ is the membrane Peclet number (dimensionless);
$Da_{SR}$ is the SR Damköhler number (dimensionless);
$W_c^{SR} \equiv \rho_c(1-\epsilon)V^{SR}$ is the SR catalyst weight (kg) wherein:
$\rho_c$ is the catalyst density (kg/m³);
$\epsilon$ is the void fraction of the packed bed (dimensionless); and
$V^{SR}$ is the packed bed volume in the MSR compartment (m³);
$P_t^{SR}$ is the operation pressure within the MSR compartment (bar);
$S^M$ is the membrane area (m²);
$A_M$ is the membrane permeability to hydrogen (mol/ (m² s bar$^{0.5}$));

wherein:
$Da_{Ox}$ is the Ox Damköhler number;
$W_c^{Ox} \equiv \rho_c(1-\epsilon)V^{Ox}$ is the Ox catalyst weight (kg) wherein:
$\rho_c$ is the catalyst density (kg/m³);
$\epsilon$ is the void fraction of the packed bed (dimensionless); and
$V_{Ox}$ is the packed bed volume in the MOx compartment(s) (m³);
$F_{mf}^{ox}$ methane feed flow rate in the MOx compartment (mol/s);
$A_{ox}$ is the Ox reaction rate coefficient (mol/(s kg)); and
$E_{Ox}$ is the Ox reaction activation energy (kJ/mol).

Table 1 below describes the range values of each one of the components of the vector of operation of the reformer of the invention, in various operation modes, in order to guarantee that the reformer would be characterized by a power output of between 0.8P<P<1.2P (80%-120% of the PGD required hydrogen input), an overall energy conversion efficiency of between 0.55<η<0.95 (55%-95% methane-to-hydrogen energy conversion efficiency), and an operation temperature of between 450° C.<T<750° C. It should be noted that, except for p3 and p4, all the components are dimensionless. For fine-tuning of the reformer of the invention, shorter range values may be used (See Table 2 below).

TABLE 1

Operation window

| OM/pi | p1 | p2 | p3 (bar) | p4 (bar) | p5 | p6 | p7 |
|---|---|---|---|---|---|---|---|
| N | 0.40-0.85 | 0.065-0.080 | 0.01-1 | 5-30 | 0.02-0.08 | 5-25 | 50-250 |
| R | 0.05-0.60 | 0.045-0.065 | 0.01-1 | 5-30 | 0.02-0.08 | 5-25 | 50-250 |
| RF | 0.10-0.70 | 0.030-0.055 | 0.01-1 | 5-30 | 0.02-0.08 | 5-25 | 50-200 |
| CCOxF | 0.10-0.70 | 0.030-0.055 | 0.01-1 | 5-30 | 0.02-0.08 | 5-25 | 50-200 |
| RF + R | 0.05-0.60 | 0.030-0.055 | 0.01-1 | 5-30 | 0.02-0.08 | 5-25 | 50-200 |
| CCOxF + R | 0.05-0.60 | 0.030-0.055 | 0.01-1 | 5-30 | 0.02-0.08 | 5-25 | 50-200 |

OM—operation mode; N—normal operation; R—recycle operation; RF—reverse flow operation; CCOxF—counter-current oxidation flow operation.

TABLE 2

Operation window (fine-tuning)

| OM/pi | p1 | p2 | p3 (bar) | p4 (bar) | p5 | p6 | p7 |
|---|---|---|---|---|---|---|---|
| N | 0.50-0.65 | 0.065-0.070 | 0.01-3 | 3-20 | 0.02-0.08 | 5-10 | 10-25 |
| R | 0.15-0.40 | 0.045-0.055 | 0.01-3 | 3-20 | 0.02-0.08 | 5-10 | 10-25 |
| RF | 0.20-0.50 | 0.030-0.045 | 0.01-3 | 3-20 | 0.02-0.08 | 5-10 | 10-20 |
| CCOxF | 0.20-0.50 | 0.030-0.045 | 0.01-3 | 3-20 | 0.02-0.08 | 5-10 | 10-20 |
| RF + R | 0.15-0.40 | 0.030-0.045 | 0.01-3 | 3-20 | 0.02-0.08 | 5-10 | 10-20 |
| CCOxF + R | 0.15-0.40 | 0.030-0.045 | 0.01-3 | 3-20 | 0.02-0.08 | 5-10 | 10-20 |

OM—operation mode; N—normal operation; R—recycle operation; RF—reverse flow operation; CCOxF—counter-current oxidation flow operation.

$A_{SR}$ is the SR reaction rate coefficient ((mol MPa$^{0.5}$)/(s kg));
$E_M$ is the membrane activation energy (kJ/mol); and
$E_{SR}$ is the SR reaction activation energy (kJ/mol);

$$p7 \equiv Da_{Ox} = \frac{W_c^{Ox}}{F_{mf}^{Ox}} A_{Ox} \exp\left(\frac{-E_{Ox}}{6.01}\right)$$

Knowing the desired PGD output power, the characteristics of the hydrogen-separating membrane, the characteristics of the catalysts (oxidation catalyst and steam-reforming catalyst), and using one of the above tables, one skilled in the art may define both the geometry of the reformer to be used and the optimal feed flow rates of the different substrates (methane, water and air).

It should be pointed out that once the weights of the two catalysts have been calculated, the volume of the reformer can be appraised: a reformer volume of about 1 L is necessary for about 1 kg of catalysts (oxidation catalyst+steam-reforming catalyst). Furthermore, the reformer geometry should fit a specific length-to-diameter ratio, which is from about 3 to about 8, preferably from about 4 to about 6 (the length and diameter of the reactor being measured from the external side of the tube defining the external MOx compartment, i.e. without the insulation layer). An example of reformer design calculation is provided in Example 1.

The following Examples are representative of techniques employed by the inventors in carrying out aspects of the present invention. It should be appreciated that while these techniques are exemplary of specific embodiments for the practice of the invention, those of skill in the art, in light of the present disclosure, will recognize that numerous modifications can be made without departing from the essence and intended scope of the invention.

EXAMPLE 1

The present example provides an illustration of the way that the main functional and structural characteristics of the reformer of the invention are calculated according to the target PGD power output, and the characteristics of the membrane(s) and catalysts intended to be used. It should be noted that, as mentioned previously, the reformer of the invention always displays the following properties: 1) a power output of between about 80% and about 120% of the PGD; 2) an overall methane-to-hydrogen conversion efficiency of between about 55% and about 95%; and 3) an operation temperature of between about 450° C. and 750° C.

In the present Example, the PGD is a PEMFC stack with a power output of 1±0.2 kW. Since the reformer of the invention can be adjusted in real-time to power variations of ±50% by varying the feed rates of methane, water and air, material quantities are calculated below for a PGD overall power output of about 1 kW. The computation of the reformer characteristics is made as follows:

(i) PGD efficiency and PGD power output (provided by the manufacturer) are introduced in p1, in order to calculate the methane feed flow rates ($F_{mf}^{SR}$, $F_{mf}^{Ox}$). The value of p1 is chosen in table 1 or table 2 disclosed above;

(ii) A value of the water feed flow rate is then calculated according to the methane feed flow rate ($F_{mf}^{SR}$) obtained previously, knowing that a water-to-methane molar ratio in the MSR feed should be of between about 2 and about 4;

(iii) The air feed flow rate ($F_{air}^{Ox}$) is then calculated from p2, by using the value of the methane Ox feed flow rate ($F_{mf}^{Ox}$) calculated previously. The value of p2 is chosen in table 1 or table 2 disclosed above.

(iv) The operation pressures in the membrane interior ($P_t^M$) and in the MSR compartment ($P_t^{SR}$) are given by p3 and p4. The MOx compartment is operated at nearly atmospheric pressure. The value of p3 and p4 are chosen in table 1 or table 2 disclosed above. Regarding the operations pressures, it should be noted that the driving force enabling the separation of hydrogen from the MSR compartment to the membrane is the difference of pressure existing between these two compartments. Therefore, the higher the difference, the better the separation would be. However, the pressure values should be also carefully chosen according to several other parameters such as the membrane structural characteristics, the pressure of hydrogen in the PGD (harmonizing the pressure between the membrane and the PGD can be advantageous), and the necessity of incorporating supplementary components besides the reformer to reach the desired pressure values (compressor, vacuum pump, etc.);

(v) Membrane area and catalyst weight are then defined. The calculation of these parameters requires prior knowledge of the hydrogen permeation characteristics of the membrane (as it is provided by the manufacturer or/and extracted experimentally), namely the membrane permeance and activation energy ($A_M$ and $E_M$, see Table 3), and of the catalyst properties, namely rate constant coefficients and activation energies ($A_{SR}$, $A_{Ox}$, $E_{SR}$, $E_{Ox}$). The rate constant coefficient and activation energy for each catalyst are provided by the manufacturer (see Table 4) but can also be extracted experimentally. Then, for given values of p5, p6 and p7 (chosen in table 1 or 2), the membrane area ($S^M$), the SR catalyst weight ($W_c^{SR}$) and the Ox catalyst weight ($W_c^{Ox}$) are extracted from the definitions of their respective vector components;

(vi) Finally, the dimension of the reformer can be calculated, on the basis of the volume-to-weight relation given by $W_c = \rho_c(1-\epsilon)V$ that results in about 1 L volume of reformer for 1 kg of catalyst (normally, $\rho_c \approx 2$ [kg/L] and $\epsilon \approx 0.5$), and on a length/diameter ratio from about 3 to about 8, preferably from about 4 to about 6.

In the present Example, the values of p1 to p7 have been chosen in the range of values presented in Table 2, on the line directed to a reformer "normal operation" mode. The chosen values are presented in Table 5 and the results extracted from the reformer operation parameters are presented in Table 6.

TABLE 3

PEMFC and membrane characteristics

| PEMFC efficiency $\eta^{FC}$ | PEMFC Power output P, kW | Membrane Permeance $A_m$, $\dfrac{mol}{m^2\ s\ bar^{0.5}}$ | Membrane Activation energy $E_M$, $\dfrac{kJ}{mol}$ |
|---|---|---|---|
| 0.6 | 1 | 1 | 10 |

TABLE 4

Ox and SR catalysts characteristics

| SR catalyst Rate constant coefficient $A_{SR}$, $\dfrac{mol\ MPa^{0.5}}{s\ kg}$ | SR catalyst Activation energy $E_{SR}$, $\dfrac{kJ}{mol}$ | Ox catalyst Rate constant coefficient $A_{Ox}$, $\dfrac{mol}{s\ kg}$ | Ox catalyst Activation energy $E_{Ox}$, $\dfrac{kJ}{mol}$ |
|---|---|---|---|
| $9 \times 10^{13}$ | 244 | $2.2 \times 10^5$ | 86 |

TABLE 5

Vector components values

| p1 | p2 | p3 | p4 | p5 | p6 | p7 |
|---|---|---|---|---|---|---|
| 0.6 | 0.07 | 1 | 20 | 0.05 | 5 | 20 |

TABLE 6

Reformer operation extracted parameters

| $Q_{mf}^{SR}, \frac{NL}{min}$ | $Q_{mf}^{Ox}, \frac{NL}{min}$ | $Q_{air}^{Ox}, \frac{NL}{min}$ | $P_t^M$, bar | $P_t^{SR}$, bar | $S^M, m^2$ | $W_c^{SR}$, kg | $W_c^{Ox}$, kg |
|---|---|---|---|---|---|---|---|
| 2.58 | 1.55 | 20.53 | 1 | 20 | 0.032 | 0.64 | 0.17 |

Table 6 shows the extracted reformer operation parameters fitting a PGD power output of about 1 kW for a reformer used in a "normal operation" mode, and containing hydrogen-separating membranes and catalysts with the characteristics disclosed in Tables 3 and 4. This set of parameters will provide the reformer efficiency (Eq. 6) of 0.65-0.7.

Based on the above, the final parameters values of the reformer are as follows (a length/diameter ratio of the reformer has been arbitrary chosen to be 5):

Feed flow rate of methane (MSR compartment): 2.58 NL/min
Feed flow rate of methane (MOx compartment): 1.55 NL/min
Feed flow rate of liquid water (MSR compartment): 4 mL/min to 8 mL/min
   Feed flow rate of air (MOx compartment): 20.53 NL/min
   Pressure in the hydrogen-separating membranes: 1 bar
   Pressure in the MSR compartment: 20 bar
   Pressure in the MOx compartment: 1 bar
   Hydrogen-separating membranes surface area: 0.032 m$^2$
   Weight of steam-reforming catalyst to load: 0.64 kg
   Weight of oxidation catalyst to load: 0.17 kg
   Volume of reformer 0.81 L (without insulation layer)
   Diameter of the reformer 5.9 cm (without insulation layer)
   Length of the reformer 29.5 cm (without insulation layer)

It should be noted that the water feed flow rate is given in mL/min (sccm) of liquid water, while the feed flow rates of methane and air are given in NL/min of gas (liter per minute at normal conditions). Since water is liquid at normal conditions and, therefore, has much higher volumetric density than gases, its volumetric supply rates are much lower than that of gaseous reactants: The number of membranes to be introduced into the MSR compartment should be calculated according to the surface area provided by a single membrane and the global surface area that should be provided according to the parameters above (in this case 0.032 m$^2$). For instance, if a single membrane has a diameter of 0.3 cm and an active length of 25 cm, its surface area would be S=2πrL=24 [cm$^2$] and 14 such membranes would be needed to provide the required separation area, which is less than 4% of the total cross-sectional area of the reformer (without insulation layer).

While presenting inhere a specific example on how calculation should be performed to determine the functional and structural parameters values for a specific embodiment of the reformer of the invention, it is clearly understood that a man skilled in the art would be able to perform similar calculations based on different input parameters such as PGD power output, PGD efficiency, membrane characteristics, catalysts characteristics, operation mode, etc., and would be able to design a reformer fitting these specific parameters.

EXAMPLE 2

Figure 7A:
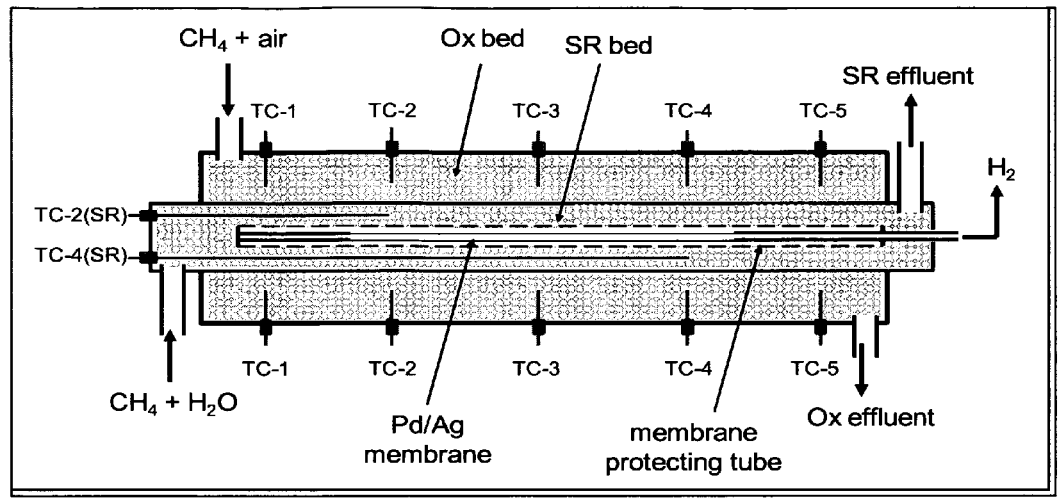
FIGS. 7A-7B are a schematic and a picture of one of the embodiment of the apparatus of the invention, respectively.
Figure 7B:
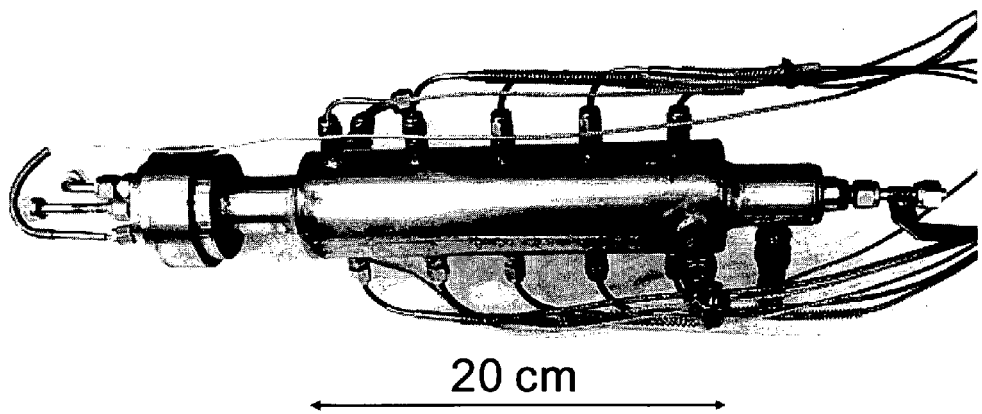
Figure 8:
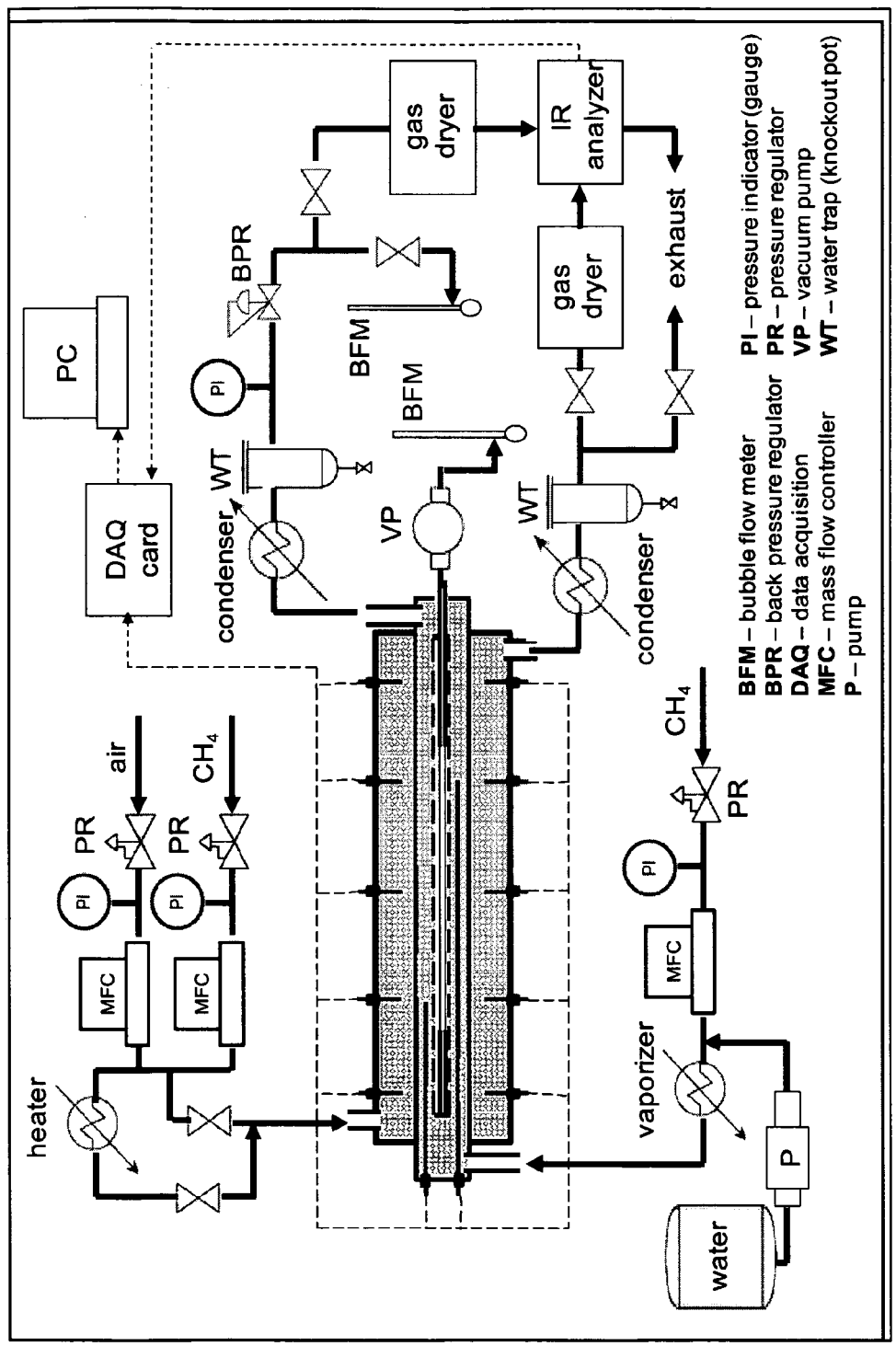
FIG. 8 schematically shows another embodiment of the system of the invention.

In the present Example, a reformer comprising a single hydrogen-separating membrane in normal operation mode has been tested. Two different membranes have been tested. A schematic diagram of the tested reformer and the experimental system flow diagram are shown in FIGS. 7A, 7B and 8, respectively. The reformer was operated at a temperature of about 550-650° C. in a fully autothermal regime for total of about 300 h. It has been found that the reformer performance is mainly defined by the dimensionless feed-to-separation ratio (Pe$_M$≡p5) and by methane utilization (MU≡p1); the main limitation was insufficient separation area.

Ni/Al$_2$O$_3$ (SG-9301, 16.5 wt % NiO, Engelhard) and Pt/Al$_2$O$_3$ (0.5 wt % Pt, Johnson Matthey) commercial catalysts were utilized for methane steam-reforming and oxidation reactions, respectively. The catalyst pellets were diluted (1:1 by weight) with pure alumina pellets (4×3 cylinders, Johnson Matthey). The reactor dimensions and catalysts specifications are listed in Table 7 below.

TABLE 7

Reactor dimensions and catalyst specifications

| section | L(active), mm | ID, mm | d(w), mm | D(catalyst), mm |
|---|---|---|---|---|
| SR | 220 | 27 | 0.9 | 3-5 |
| Ox | 220 | 60 | 1.6 | 4-6 |

L—length; ID—inner diameter; d(w)—the compartment wall thickness; D—spherical shape catalysts diameters.

Two commercially available membranes were tested: (i) Pd/Ag foil tube (Johnson Matthey, UK) and (ii) dead-ended Inconel-supported Pd/Ag film (REB, Research & Consulting, US). The membranes dimensions, activation energies and permeability coefficients are provided in Table 8 below.

TABLE 8

Membrane dimensions and permeability characteristics

| membrane | type | S, cm$^2$ | L, mm | D, mm |
|---|---|---|---|---|
| A (JM, UK) | Pd/Ag foil | 7.5 | 150 | 1.6 |
| B (REB, US) | Pd/Ag film (Inconel-supported) | 15 | 150 | 3.2 |

| membrane | d, μm | Ea [kJ/mol] | A$_0$ [mol/(m$^2$ s bar)] | Ref. |
|---|---|---|---|---|
| A (JM, UK) | 70 | 6.6 | 0.4 | JM, UK |
| B (REB, US) | 10 | 10.7 | 0.9 | REB, US |

S—surface area; L—length; D—diameter; d—the thickness of the separation (Pd—Ag) layer; E$_a$—activation energy; A$_0$—rate constant coefficient; Ref.—reference.

Figure 9A:
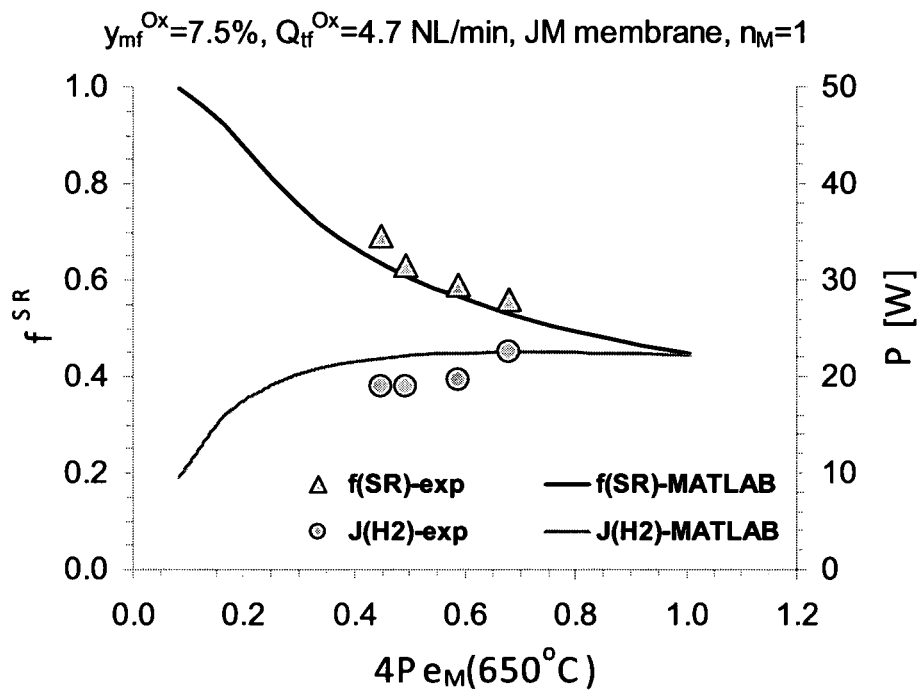
FIG. 9A is a graph showing the performance of Pd—Ag foil hydrogen-separating membranes when used in one of the embodiment of the apparatus of the invention (experimental data vs. numerical model)
Figure 9B:
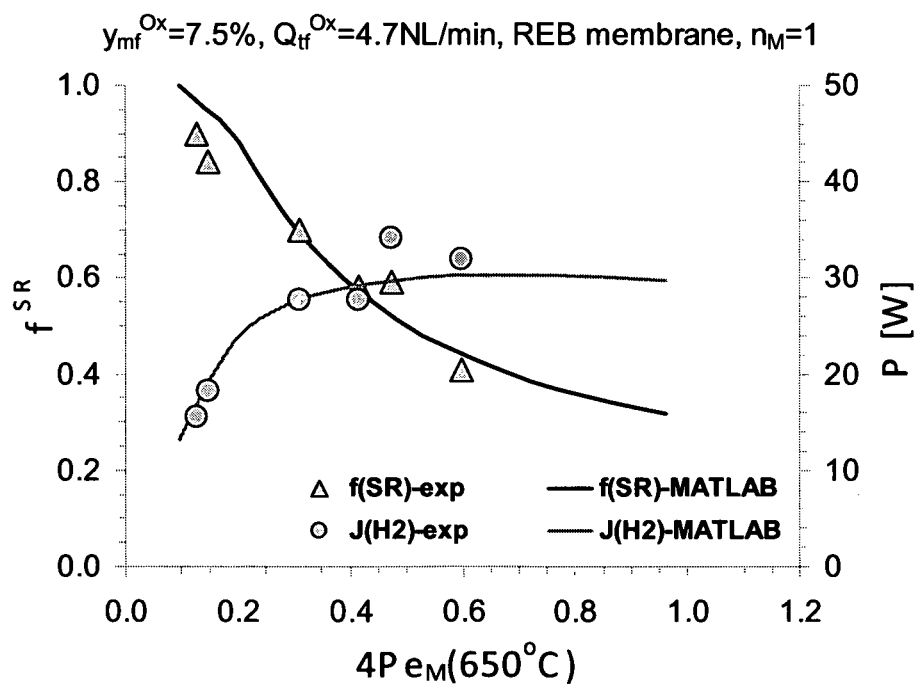
FIG. 9B is a graph showing the performance of Pd—Ag/Inconel® hydrogen-separating membranes when used in one of the embodiment of the apparatus of the invention (experimental data vs. numerical model).

FIGS. 9A and 9B shows the comparative performance of the two membranes tested, in terms of SR conversion (f$^{SR}$) and expected PGD power output (P, Eq. 5) as a function of the membrane Peclet number (Pe$_M$). The experimental data (symbols) are compared to the numerical simulation (lines) performed by MATLAB using a comprehensive transient model of the reformer that includes SR and Ox reactions, heat transfer between the compartments, heat and mass transfer within the catalytic bed, membrane separation, and heat losses. The heat transfer correlations used in the model were extracted from the experimental data. The model has been found to predict well experimental data (FIGS. 9A and 9B)

and has been employed to verify the optimal operation window parameters given in Table 1.

It should be noted that high MSR conversions can be achieved for $4Pe_M<0.2$ and that the conversion decreases with $Pe_M$. On the other hand, the power output increases with $Pe_M$, attaining a plateau for $4Pe_M>0.4$. Furthermore, it should be noted that the performance of the two different membranes are quite similar when it is expressed using the dimensionless parameter ($Pe_M$) of the invention, which strengthens the validity and generality of the operation window determination approach presented above.

While the invention has been described using some specific examples, many modifications and variations are possible. It is therefore understood that the invention is not intended to be limited in any way, other than by the scope of the appended claims.

The invention claimed is:

1. A process for producing hydrogen from a natural gas, said process comprising the steps of:
   (i) providing an autothermal heat exchanger packed-bed membrane reformer (APBMR) comprising:
      (a) an external gas oxidation tube comprising an inlet, an outlet and packed oxidation catalyst particles, said inlet and outlet being located each at one extremity of said external gas oxidation tube;
      (b) gas steam-reforming tube disposed within said external gas oxidation tube and substantially parallel to a longitudinal axis of said external gas oxidation tube, said gas steam-reforming tube comprising an inlet, an outlet and packed steam-reforming catalyst particles, said inlet and outlet being located each at one extremity of said internal gas steam-reforming tube;
      (c) at least one hydrogen-separating membrane disposed within said steam-reforming tube and substantially parallel to the longitudinal axis of said steam-reforming tube;
      (d) one insulation layer surrounding said external tube; and,
      (e) at least one internal gas oxidation tube disposed within said steam-reforming tube and substantially parallel to the longitudinal axis of said gas steam-reforming internal tube, and comprising an inlet, an outlet and packed oxidation catalyst particles, said inlet and outlet being located each at an extremity of said at least one internal gas oxidation tube wherein said inlet(s) of said internal gas oxidation tube(s) and said inlet of said external gas oxidation tube are located at opposite extremities, providing opposing flow direction alongside said steam reforming tube, so as to reduce temperature gradient along said steam reforming tube;
   (ii) supplying a mixture comprising said natural gas and air to said gas oxidation tube(s) of said reformer; and
   (iii) supplying a mixture comprising said natural gas and water to said gas steam-reforming tube, wherein the water-to-gas molar ratio is of between 2 and 4, and wherein the water may be pre-vaporized before being supplied into said gas steam-reforming tube;
      thereby producing hydrogen suitable to be directly fed into a power generating device (PGD) to generate an electrical power, or to be stored into a suitable container before further use.

2. A process according to claim 1, wherein the natural gas is methane.

3. A process according to claim 1, wherein the autothermal heat exchanger APBMR has a power output of between about 80% and 120% of the PGD power output, an overall methane-to-hydrogen conversion efficiency of between about 55% and about 95%, and is operated at a temperature of between 450° C. and 750° C.

4. A process according to claim 1, wherein the PGD power output is of between about 0.1 kW and about 10 kW.

5. A process according to claim 1, wherein the PGD is a polymer electrolyte membrane fuel cell (PEMFC) stack.

6. A process according to claim 5, wherein the power efficiency of the PGD is about 0.6 and the autothermal heat exchanger APBMR has a volumetric power density of between about 0.5 kW/L and about 2 kW/L, more preferably between about 0.7 kW/L and about 1.5 kW/L, and more preferably between about 0.9 kW/L to about 1.1 kW/L.

7. A process according to claim 1, wherein the hydrogen produced comprises less than about 50 ppm of CO, preferably less than about 10 ppm of CO, and more preferably less than 5 ppm of CO.

8. A process according to claim 1, wherein said autothermal packed-bed membrane reformer is operated in a normal operation mode.

9. A process according to claim 1, wherein said autothermal packed-bed membrane reformer is operated in a reverse flow operation mode.

10. A process according to claim 1, wherein said autothermal packed-bed membrane reformer is operated in a counter-current oxidative flow operation mode.

11. A process according to claim 1, wherein said autothermal packed-bed membrane reformer is operated in a mode selected from normal operation mode, reverse flow operation mode, and counter-current oxidative flow operation mode; and wherein said autothermal packed-bed membrane reformer is additionally operated in a recycling operation mode.

12. An autothermal heat exchanger packed-bed membrane reformer (APBMR) comprising:
   (a) an external gas oxidation tube-comprising an inlet, an outlet and packed oxidation catalyst particles, said inlet and outlet being located each at one extremity of said external gas oxidation tube;
   (b) a gas steam-reforming tube-disposed within said external gas oxidation tube and substantially parallel to a longitudinal axis of said external gas oxidation tube, said gas steam-reforming tube comprising an inlet, an outlet and packed steam-reforming catalyst particles, said inlet and outlet being located each at one extremity of said internal gas steam-reforming tube;
   (c) at least one hydrogen-separating membrane disposed within said steam-reforming tube, and substantially parallel to the longitudinal axis of said steam-reforming tube;
   (d) at least one insulation layer surrounding said external tube; and
   (e) at least one internal gas oxidation tube disposed within said steam-reforming tube, and substantially parallel to the longitudinal axis of said gas steam-reforming internal tube, and comprising an inlet, an outlet and packed oxidation catalyst particles, said inlet and outlet being located each at one extremity of said at least one internal gas oxidation tube,
      wherein said at least one inlet of said at least one internal gas oxidation tube and said inlet of said external gas oxidation tube are located at opposite extremities, providing opposing flow direction alongside said steam reforming tube, so as to reduce temperature gradient along said steam reforming tube.

13. An autothermal heat exchanger APBMR according to claim 12, wherein the external gas oxidation tube and the internal gas steam-reforming tube are made of two concentric hollow tubes.

14. An autothermal heat exchanger APBMR according to claim 12, characterized by a length-to-diameter ratio of between about 3 to about 8, wherein said length and said diameter are taken from the external side of the external gas oxidation tube.

15. An autothermal heat exchanger APBMR according to claim 14, characterized by a length of between about 10 cm and 150 cm, preferably between about 20 cm and 70 cm, and more preferably about 30 cm and 50 cm.

16. An autothermal heat exchanger APBMR according to claim 12, characterized by an insulation layer having a thickness of about 2 cm to 15 cm.

17. An autothermal heat exchanger APBMR according to claim 12, wherein the oxidation catalyst particles are spherical pellets of between about 4 mm and 6 mm diameter, and the steam-reforming particles are spherical pellets of between about 3 mm and 5 mm diameter.

18. An autothermal heat exchanger APBMR according to claim 12, wherein the oxidation catalyst particles are $Pt/Al_2O_3$ or $Pd/Al_2O_3$ pellets.

19. An autothermal heat exchanger APBMR according to claim 12, wherein the steam-reforming catalyst particles are $Ni/Al_2O_3$ pellets.

20. An autothermal heat exchanger APBMR according to claim 12, wherein the hydrogen selective membranes are Pd—Ag membranes selected from the group consisting of Pd—Ag foil membranes and Pd—Ag thin films membrane coated on ceramic tubes, stainless steel tubes, or Inconel® tubes.

21. A system for converting natural gas into hydrogen and provide a source of electrical power, said system comprising:
(a) an autothermal heat exchanger packed-bed membrane reformer APBMR according to claim 12 suitable to convert a natural gas into hydrogen, wherein part of said gas is combusted to provide heat; and
(b) a power generating device suitable to convert a source of hydrogen into an electrical power.

22. An autothermal heat exchanger APBMR according to claim 12, wherein said autothermal packed-bed membrane reformer is operated in a normal operation mode.

23. An autothermal heat exchanger APBMR according to claim 12, wherein said autothermal packed-bed membrane reformer is operated in a reverse flow operation mode.

24. The autothermal heat exchanger APBMR according to claim 12, wherein said at least one inlet of at least one internal gas oxidation tube and said at least one inlet of at least one external gas oxidation tube is configured to operate in a counter-current oxidative flow operation mode.

25. An autothermal heat exchanger APBMR according to claim 12, wherein said autothermal packed-bed membrane reformer is operated in a mode selected from normal operation mode, reverse flow operation mode, and counter-current oxidative flow operation mode; and wherein said autothermal packed-bed membrane reformer is additionally operated in a recycling operation mode.

* * * * *